United States Patent
An et al.

(10) Patent No.: US 12,335,421 B2
(45) Date of Patent: Jun. 17, 2025

(54) ELECTRONIC DEVICE INCLUDING ANTENNA

(71) Applicant: Samsung Electronics Co., Ltd., Gyeonggi-do (KR)

(72) Inventors: Seongyong An, Gyeonggi-do (KR); Jiho Kim, Gyeonggi-do (KR); Kyihyun Jang, Gyeonggi-do (KR); Kyungmoon Seol, Gyeonggi-do (KR); Yoonjung Kim, Gyeonggi-do (KR); Hyungjin Kim, Gyeonggi-do (KR); Bumjin Cho, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 381 days.

(21) Appl. No.: 17/860,494

(22) Filed: Jul. 8, 2022

(65) Prior Publication Data

US 2023/0007108 A1 Jan. 5, 2023

Related U.S. Application Data

(63) Continuation of application No. PCT/KR2022/009323, filed on Jun. 29, 2022.

(30) Foreign Application Priority Data

Jun. 30, 2021 (KR) .......... 10-2021-0085260

(51) Int. Cl.
*H04M 1/02* (2006.01)
*H01Q 1/24* (2006.01)

(52) U.S. Cl.
CPC ........... *H04M 1/026* (2013.01); *H01Q 1/243* (2013.01)

(58) Field of Classification Search
CPC .............................. H04M 1/026; H01Q 1/243
(Continued)

(56) References Cited

U.S. PATENT DOCUMENTS

| | | | |
|---|---|---|---|
| 10,372,166 B2 | 8/2019 | Gable et al. | |
| 11,075,446 B2 | 7/2021 | Khripkov et al. | |

(Continued)

FOREIGN PATENT DOCUMENTS

| | | | |
|---|---|---|---|
| CN | 109719502 A | 5/2019 | |
| CN | 110505325 A | 11/2019 | |

(Continued)

OTHER PUBLICATIONS

Bonding Mechanism and Strength of Metals to Ceramics; Journal of Welding and Joining, vol. 32 No. 1 (2014).
International Search Report dated Oct. 11, 2022.

*Primary Examiner* — Mark G. Pannell
(74) *Attorney, Agent, or Firm* — Cha & Reiter, LLC

(57) ABSTRACT

According to an embodiment, an electronic device may include a side member including a conductive part and a first non-conductive part, a frame member disposed on at least a portion of the side member to be at least partially visible from an exterior, a second non-conductive part disposed between the frame member and the first non-conductive part, at least one conductive member disposed between the second non-conductive part and the first non-conductive part, at least one conductive structure disposed near the conductive member in an internal space of the electronic device, and a wireless communication circuit disposed in the internal space and configured to transmit or receive via the at least one conductive member. The conductive member may include a stepped portion so that at least a portion of the conductive member may be disposed in a direction away from the conductive structure.

20 Claims, 18 Drawing Sheets

(58) Field of Classification Search
USPC .................................................... 455/575.7
See application file for complete search history.

(56) References Cited

U.S. PATENT DOCUMENTS

| | | |
|---|---|---|
| 2008/0001832 A1 | 1/2008 | Murakami et al. |
| 2010/0029339 A1* | 2/2010 | Kim .................... H04M 1/0266 |
| | | 455/566 |
| 2013/0175911 A1* | 7/2013 | Senatori ................. B29C 65/54 |
| | | 312/223.1 |
| 2016/0044801 A1 | 2/2016 | Lee et al. |
| 2016/0088130 A1* | 3/2016 | Jung ..................... G06F 1/1626 |
| | | 455/575.1 |
| 2016/0327821 A1* | 11/2016 | Oohira ................ G02F 1/13439 |
| 2017/0141458 A1* | 5/2017 | Kwon .................. G06F 1/1635 |
| 2017/0300736 A1* | 10/2017 | Song .................. G06V 40/1312 |
| 2018/0081481 A1 | 3/2018 | Fournier et al. |
| 2018/0093312 A1* | 4/2018 | Ran ..................... H04M 1/0202 |
| 2019/0027812 A1* | 1/2019 | Kim ....................... H04M 1/18 |
| 2019/0070760 A1* | 3/2019 | Huang ................ H04M 1/0202 |
| 2019/0260861 A1* | 8/2019 | Wang ................. H04M 1/0202 |
| 2021/0151856 A1 | 5/2021 | Kim et al. |
| 2022/0345552 A1 | 10/2022 | Wu et al. |

FOREIGN PATENT DOCUMENTS

| | | |
|---|---|---|
| CN | 110324467 A | 8/2020 |
| KR | 10-0859080 B1 | 9/2008 |
| KR | 10-0977035 B1 | 8/2010 |
| KR | 10-2016-0019248 A | 2/2016 |
| KR | 10-2020-0128172 A | 11/2020 |
| KR | 10-2021-0061859 A | 5/2021 |

* cited by examiner

ELECTRONIC DEVICE INCLUDING ANTENNA

CROSS-REFERENCE TO RELATED APPLICATION(S)

This application is a continuation of International application No. PCT/KR2022/009323, filed on Jun. 29, 2022, which is based on and claims the benefit of a Korean patent application number 10-2021-0085260, filed on Jun. 30, 2021, in the Korean Intellectual Property Office, the disclosure of which is incorporated by reference herein in its entirety.

TECHNICAL FIELD

One or more embodiments of the instant disclosure generally relate to an electronic device including an antenna.

BACKGROUND ART

Electronic devices have gradually become smaller and slimmer, while the functions thereof have gradually increased. As electronic devices become smaller and slimmer, metal material (e.g., conductive part) of the electronic devices may be used for the purpose of reinforcing rigidity and/or used to implement a predetermined function (e.g., serving as an antenna). Since the use of such a metal material increases production cost and may cause constraints in design, a frame member made of a material different from the metal material may be applied to the electronic device along with the metal material.

An electronic device may include a housing structure for providing a space for accommodating electronic components. The housing structure may include a first plate, a second plate facing away from the first plate, and a side member disposed to surround a space between the first plate and the second plate. The side member may include a support member extending at least partially into the internal space of the electronic device. At least a portion of the side member may be made of a metallic material (which may be referred to as a conductive part, a conductive member, or a conductive material) to reinforce the rigidity of the electronic device and/or used to implement a predetermined function (e.g., serving as an antenna), and the remaining portion may be made of a polymer material (which may be referred to as a non-conductive part, a non-conductive member, or a non-conductive material), and the remaining portion may be combined with the metal material.

The electronic device may include a frame member made of a different material that forms at least a portion of the exterior (e.g., the side surface) of the electronic device by being coupled to at least a portion of the side member. The frame member may be formed of a ferroelectric ceramic material. The electronic device may include at least one antenna for transmitting or receiving wireless signals using at least a portion of the metal material disposed on the side member. Meanwhile, since it may be difficult to bond the ceramic frame member to the metallic portion of the antenna and/or the side member, the frame member may be bonded to the side member through injection molding that molds a polymer material and another injection-molded material. In this case, the antenna may be disposed between the polymer material and the frame member via the injection-molded material while being at least partially supported by the polymer material.

However, when the antenna located between the side member and the frame member is disposed adjacent to a conductive structure (e.g., display) disposed in the internal space of the electronic device, its radiation performance may be degraded.

SUMMARY

According to an embodiment, an electronic device may include a side member including a conductive part and a first non-conductive part, a frame member disposed on at least a portion of the side member to be at least partially visible from an exterior of the electronic device, a second non-conductive part disposed between the frame member and the first non-conductive part, at least one conductive member disposed between the second non-conductive part and the first non-conductive part, at least one conductive structure disposed near the at least one conductive member in an internal space of the electronic device, and a wireless communication circuit disposed in the internal space and configured to transmit or receive a wireless signal in at least one predetermined frequency band via the at least one conductive member, wherein the at least one conductive member includes at least one stepped portion so that at least a portion of the at least one conductive member may be disposed in a direction away from the at least one conductive structure.

According to an embodiment of the disclosure, it is possible to provide an electronic device having an antenna arrangement structure configured to reduce the degradation of radiation performance.

According to certain embodiments, it is possible to provide an electronic device having an antenna arrangement structure that is capable of helping to reinforce rigidity while suppressing the degradation of radiation performance of the antenna.

However, the problems to be solved in the disclosure are not limited to the above-mentioned problems, and may be variously expanded without departing from the spirit and scope of the disclosure.

The electronic device according to certain embodiments of the disclosure includes an antenna arrangement structure that provides sufficient separation distance from a conductive structure disposed in the internal space of the electronic device, so that it is possible to suppress the degradation of the radiation performance of the antenna and to reinforce the rigidity of the electronic device.

In addition, various effects directly or indirectly identified through the disclosure may be provided.

DESCRIPTION OF DRAWINGS

In connection with the description of the drawings, the same or similar components may be denoted by the same or similar reference numerals.

DETAILED DESCRIPTION

Figure 1:
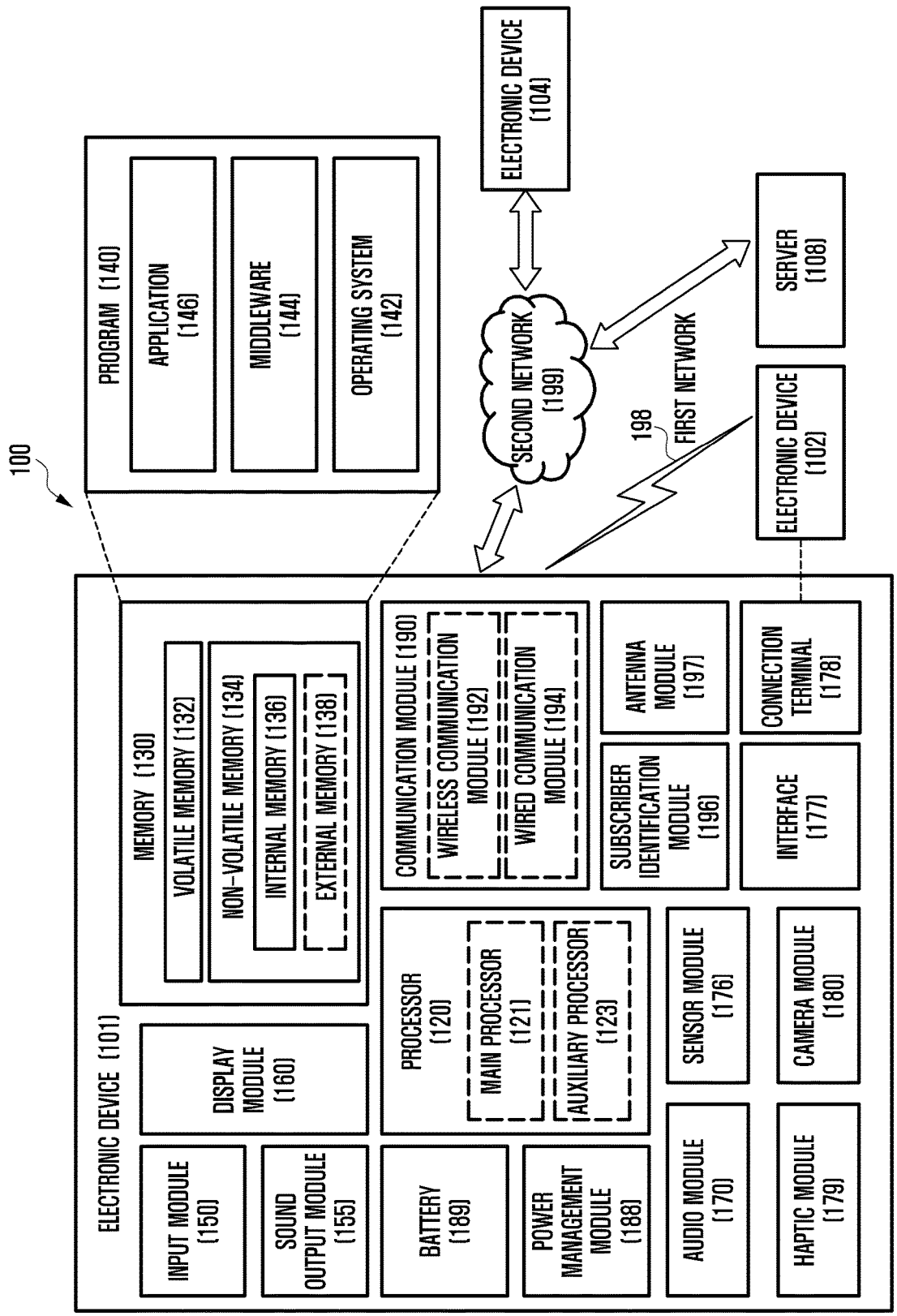
FIG. 1 is a block diagram of an electronic device according to an embodiment of the disclosure in a network environment.

FIG. 1 is a block diagram illustrating an example electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
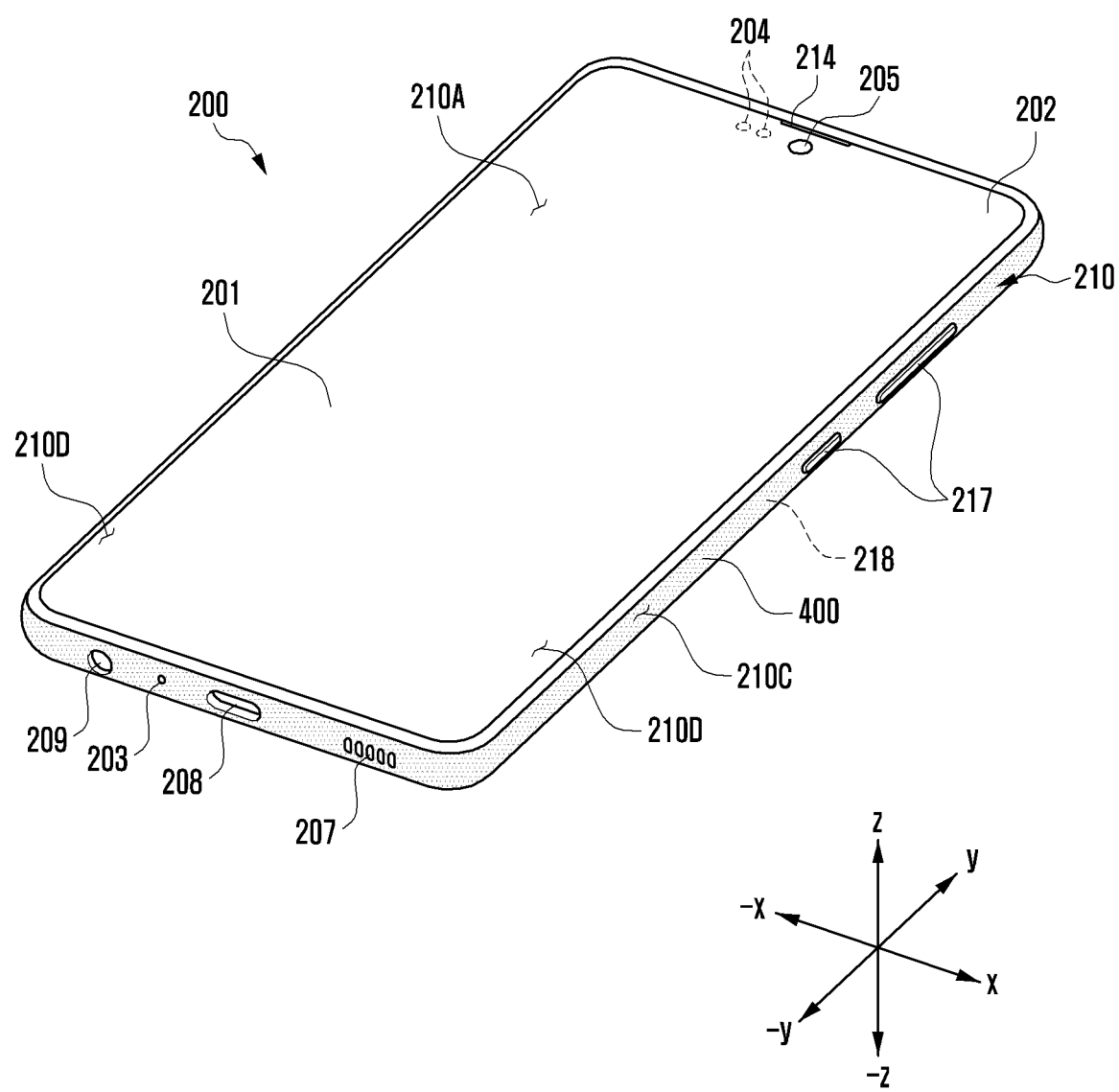
FIG. 2A is a front perspective view illustrating an electronic device (e.g., a mobile electronic device) according to an embodiment of the disclosure.
Figure 2B:
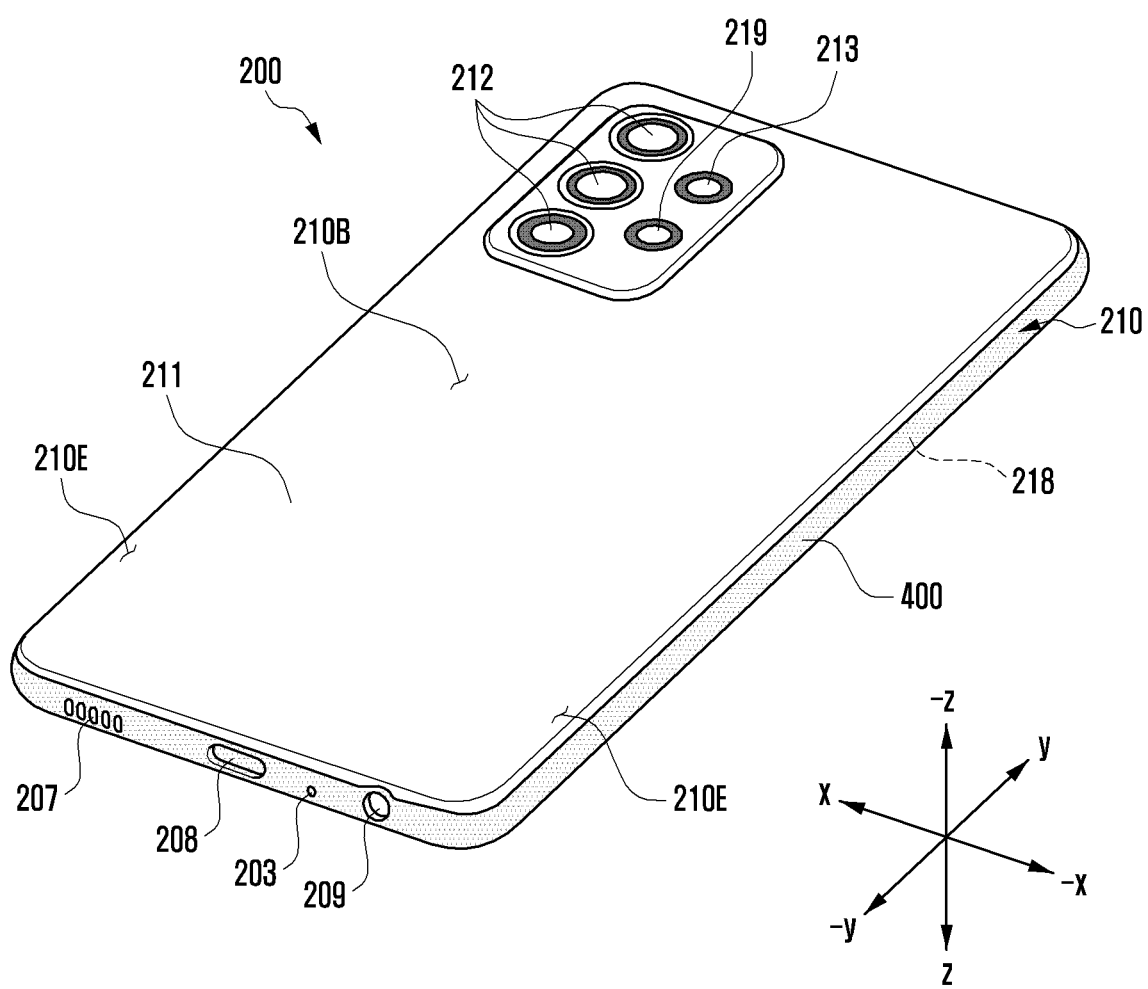
FIG. 2B is a rear perspective view illustrating the electronic device of FIG. 2A according to an embodiment of the disclosure.

FIG. 2A illustrates a perspective view showing a front surface of a mobile electronic device 200 according to an embodiment, and FIG. 2B illustrates a perspective view showing a rear surface of the mobile electronic device 200 shown in FIG. 2A.

The electronic device 200 in FIGS. 2A and 2B may be at least partially similar to the electronic device 101 in FIG. 1 or may further include other embodiments.

Referring to FIGS. 2A and 2B, the mobile electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the mobile electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The mobile electronic device 200 may include at least one of a display 201, audio modules 203, 207 and 214, sensor modules 204 and 219, camera modules 205, 212 and 213, a key input device 217, a light emitting device, and connector holes 208 and 209. The mobile electronic device 200 may omit at least one (e.g., the key input device 217 or the light emitting device) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E. According to certain embodiments, the input device 203 may include at least one microphone. In certain embodiments, the input device 203 may include a plurality of microphones disposed to detect the direction of a sound. According to an embodiment, the sound output devices 201 and 202 may include speakers. According to an embodiment, the input device 203 may include a receiver for calls disposed in the first housing 210, and a speaker. In certain embodiments, the input device 203, the sound output devices 201 and 202, and the connector port 207 may be disposed in a space arranged in the first housing 210 and/or the second housing 220 of the electronic device 200, and may be exposed to the external environment through at least one hole formed in the first housing 210 and/or the second housing 220. In certain embodiments, the sound output devices 201 and 202 may include a speaker (e.g., piezo speaker) that operates without using a hole formed in the first housing 210 and/or the second housing 220.

The sensor modules 204 and 219 may generate electrical signals or data corresponding to an internal operating state of the mobile electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device 205 disposed on the first surface 210A of the electronic device 200, and a second camera device 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the electronic device 200.

The key input device 217 may be disposed on the lateral surface 210C of the housing 210. The mobile electronic device 200 may not include some or all of the key input device 217 described above, and the key input device 217 which is not included may be implemented in another form such as a soft key on the display 201. The key input device 217 may include the sensor module disposed on the second surface 210B of the housing 210.

The light emitting device may be disposed on the first surface 210A of the housing 210. For example, the light emitting device may provide status information of the electronic device 200 in an optical form. The light emitting device may provide a light source associated with the operation of the camera module 205. The light emitting device may include, for example, a light emitting diode (LED), an IR LED, or a xenon lamp.

The connector holes 208 and 209 may include a first connector hole 208 adapted for a connector (e.g., a USB connector) for transmitting and receiving power and/or data to and from an external electronic device, and/or a second connector hole 209 adapted for a connector (e.g., an earphone jack) for transmitting and receiving an audio signal to and from an external electronic device.

Some sensor modules 205 of camera modules 205 and 212, some sensor modules 204 of sensor modules 204 and 219, or an indicator may be arranged to be exposed through a display 201. For example, the camera module 205, the sensor module 204, or the indicator may be arranged in the internal space of an electronic device 200 so as to be brought into contact with an external environment through an opening of the display 201, which is perforated up to a front plate 202. According to an embodiment, an area corresponding to some camera module 105 of the display 201 is a part of an area in which content is displayed, and may be formed as a transmission area having designated transmittance. For example, the transmission area may be formed to have transmittance having a range of about 5% to about 30%. For example, the transmission area may be formed to have transmittance having a range of about 30% to about 50%. For example, the transmission area may be formed to have transmittance having a range of over 50%. The transmission area may include an area overlapped with a valid area (e.g., a field of view (FOV)) of the camera module 105 through which light imaged by an image sensor and for generating an image passes. For example, a transmission area of the display 201 may include an area in which the density of pixels and/or a wiring density are lower than that of surroundings. The camera module 205 may include, for example, under display camera (UDC). In another embodiment, some sensor modules 204 may be arranged to perform their functions without being visually exposed through the front plate 202 in the internal space of the electronic device. For example, in this case, an area of the display 201 facing the sensor module may not require a perforated opening.

According to various embodiments, an electronic device 200 has a bar-type or plate-type appearance, but the disclosure is not limited thereto. For example, the illustrated electronic device 200 may be a part of a foldable electronic device, a slidable electronic device, a stretchable electronic device, and/or a rollable electronic device. The "foldable electronic device", the "slidable electronic device", the "stretchable electronic device", and/or the "rollable electronic device" may be an electronic device in which, since the display (e.g., the display 330 in FIG. 3) is bendable, the display is capable of being at least partially folded, wound or rolled, at least partially expanded in area, and/or received inside a housing (e.g., the housing 210 in FIGS. 2A and 2B). In the case of the foldable electronic device, the slidable electronic device, the stretchable electronic device, and/or the rollable electronic device, a user may use a screen display region in an expanded state by unfolding the display or exposing a greater area of the display to the exterior if necessary.

According to certain embodiments, an electronic device 200 may include a frame member 400 coupled to at least a portion of a side member 218. According to an embodiment, the frame member 400 may be made of a ceramic material. According to an embodiment, the frame member 400 may be bonded to the side member 218 via an injection-molded element (e.g., the second non-conductive part 313 of FIG.

3). According to an embodiment, the electronic device 200 may include at least one conductive member (e.g., the conductive members 314 and 315 of FIG. 4B) disposed between the side member 218 and the frame member 400 and used as an antenna. According to an embodiment, in the electronic device 200, the conductive member may have improved shape and arrangement structure to suppress the degradation of radiation performance by a conductive structure (e.g., the display 201) disposed in the internal space.

Figure 3:
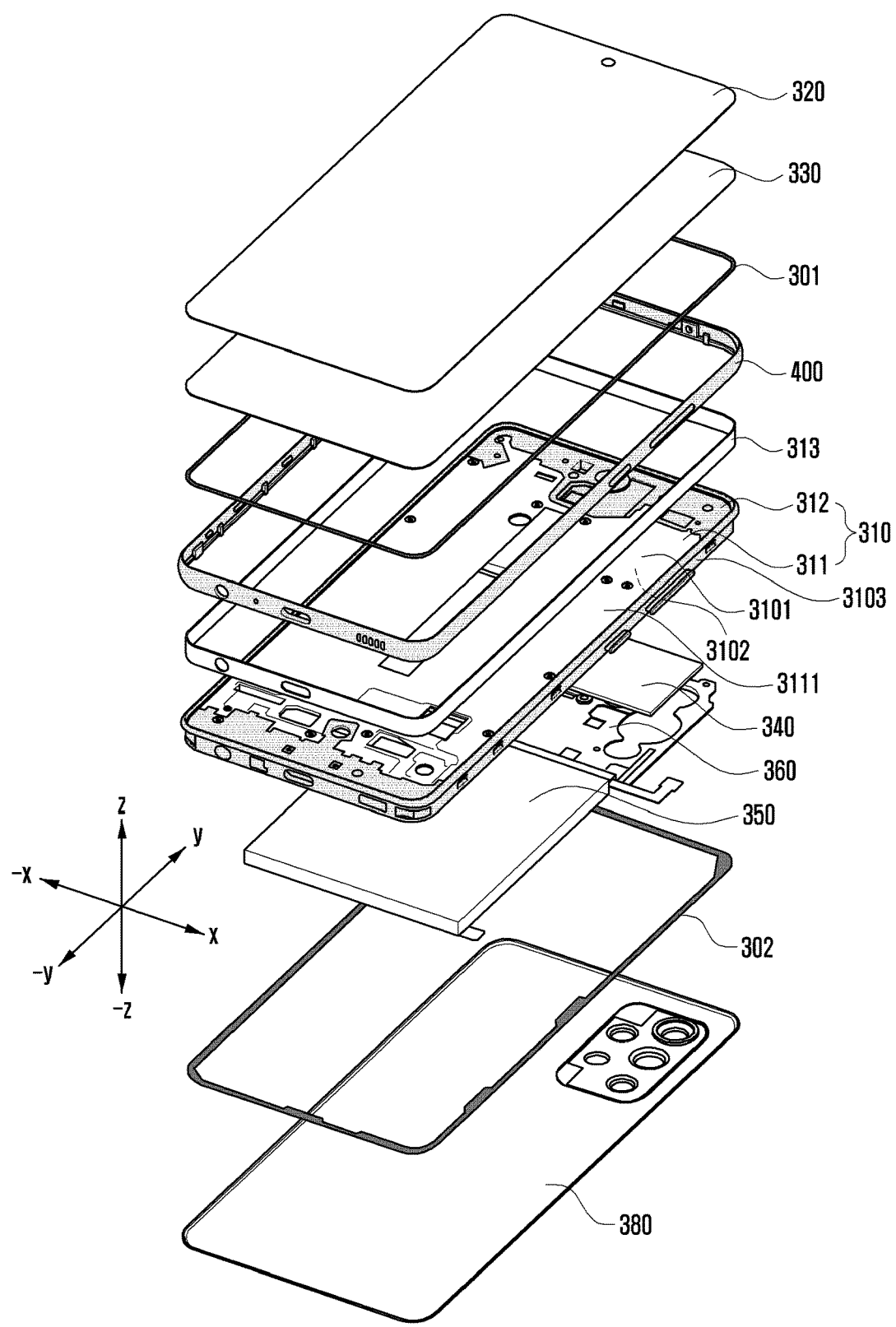
FIG. 3 is an exploded perspective view illustrating the electronic device of FIG. 1 according to an embodiment of the disclosure.

FIG. 3 is an exploded perspective view illustrating the electronic device of FIG. 2A according to an embodiment of the disclosure.

The electronic device of FIG. 3 may be at least partially similar to the electronic device 101 of FIG. 1 and/or the electronic device 200 of FIGS. 2A and 2B, or may further illustrate other embodiments of the electronic devices.

Referring to FIG. 3, the electronic device 300 (e.g., the electronic device 200 in FIG. 2A) may include a side member 310 (e.g., side bezel structure) (e.g., the side bezel structure 218 in FIG. 2A), a support member 3111 (e.g., support structure), a first plate 320 (e.g., the front plate 202 or the front cover in FIG. 2A), a display 330 (e.g., the display 201 in FIG. 2A), at least one substrate 340 (e.g., printed circuit board (PCB), flexible PCB (FPCB), or rigid-flexible PCB (R-FPCB)), a battery 350, an additional support member 360 (e.g., rear case), an antenna (not illustrated), and a second plate 380 (e.g., the rear plate 211 or the rear cover in FIG. 2B). In some embodiments, in the electronic device 300, at least one of the components (e.g., the support member 3111 or the additional support member 360) may be omitted, or other components may be additionally included. At least one of the components of the electronic device 300 may be the same as or similar to at least one of the components of the electronic device 200 of FIG. 2A or 2B, and redundant description thereof may be omitted below.

According to an embodiment, the side member 310 may include a first surface 3101 oriented in a first direction (e.g., z-axis direction), a second surface 3102 facing away from the first surface 3101, and a side surface 3103 surrounding the space between the first surface 3101 and the second surface 3102. According to an embodiment, the side member 310 may be a bracket disposed inside the electronic device 300. According to an embodiment, the side member 310 may include a conductive part 311 and a first non-conductive part 312 coupled to the conductive part 311 through injection molding. According to an embodiment, the support member 3111 may be disposed in the manner of extending from the side member 310 toward the internal space (e.g., the internal space 3001 of FIG. 4A) of the electronic device 300. For example, the support member 3111 may be disposed in the manner of extending from the conductive part 311 (e.g., metal material) and/or the first non-conductive part 312 (e.g., non-metal material (e.g., polymer)) of the side member 310. In some embodiments, the support member 3111 may be disposed separately from the side member 310. According to an embodiment, the side member 310 and/or the support member 3111 may be implemented by, for example, the conductive part 311 (e.g., metal material) and/or the first non-conductive part 312 (e.g., non-metal material (e.g., polymer)). According to an embodiment, the first non-conductive part 312 may be coupled to the conductive part 311 by injection-molding. According to an embodiment, the side member 310 may be configured such that the first non-conductive part 312 is disposed along at least a portion of an edge (e.g., the side surface 3103). According to an embodiment, the support member 3111 may support at least a portion of the display 330 via the first surface 3101, and may be disposed to support at least one board 340 and/or at least a portion of a battery 350 via the second surface 3102. According to an embodiment, the at least one board 340 may include a processor, a memory, and/or an interface. According to an embodiment, the processor may include one or more of, for example, a central processing unit, an application processor, a graphics processor, an image signal processor, a sensor hub processor, or a communication processor. According to an embodiment, the memory may include, for example, a volatile memory or a nonvolatile memory. According to an embodiment, the interface may include, for example, a high-definition multimedia interface (HDMI), a universal serial bus (USB) interface, an SD card interface, and/or an audio interface. The interface may electrically or physically connect, for example, the electronic device 300 to an external electronic device and may include a USB connector, an SD card/an MMC connector, or an audio connector. According to an embodiment, the battery 350 is a device for supplying power to at least one component of the electronic device 300, and may include, for example, a non-rechargeable primary battery, a rechargeable secondary battery, or a fuel cell. At least a portion of the battery 350 may be disposed on, for example, a plane substantially coplanar with the at least one board 340. According to an embodiment, the battery 350 may be disposed in a manner of being embedded in the electronic device 300. In some embodiments, the battery 350 may be disposed to be user-removable from the electronic device 300.

According to an embodiment, an antenna (not illustrated) may be disposed between the second plate 380 and the battery 350. The antenna may include, for example, a near field communication (NFC) antenna, a wireless charging antenna, and/or a magnetic secure transmission (MST) antenna. The antenna may perform short-range communication with, for example, an external device, or may wirelessly transmit/receive power required for charging to/from an external device. In some embodiments, the antenna structure of the antenna may be implemented by a portion of the side member 310, and/or a portion of the support member 3111, or a combination thereof. In some embodiments, the electronic device 300 may further include a digitizer for detecting an external electronic pen.

According to an embodiment, the electronic device 300 may include one or more waterproofing members 301 and 302. According to an embodiment, the one or more waterproofing member 301 and 302 may include a first waterproofing member 301 disposed between a first surface 3101 of the side member 310 and the first plate 320 and a second waterproofing member 302 disposed between a second surface 3102 of the side member 310 and the second plate 380. According to an embodiment, the one or more waterproofing members 301 and 302 may seal the internal space (e.g., the internal space 3001 in FIG. 4A) of the electronic device 300, thereby blocking the introduction of external foreign substance or moisture into the internal space. According to an embodiment, the one or more waterproofing members 301 and 302 may provide a coupling force for coupling the first plate 320 and the second plate 380 to the side member 310. To provide such a coupling force, the one or more waterproofing members 301 and 302 may include at least one of tape, adhesive, waterproofing dispenser, silicon, waterproofing rubber, and urethane.

According to an embodiment, the electronic device 300 may include a frame member 400 coupled to at least a portion of the side surface 3103 of the side member 310.

According to an embodiment, the frame member 400 may be made of a ceramic material having a high dielectric constant. According to an embodiment, the frame member 400 may be disposed as a loop along the side surface 3103. According to an embodiment, the frame member 400 may be a closed loop disposed along the side surface 3103. In some embodiments, the frame member 400 may be an open loop (e.g. a loop having an opening) disposed along the side surface 3103. According to an embodiment, the side surface 3103 of the side member 310 may be disposed to be covered by the frame member 400 so that the side surface 3103 is not visible from outside the electronic device. In some embodiments, at least a portion of the side surface 3103 of the side member 310 may be exposed to be visible through the space between the frame member 400 and the first plate 320 or the space between the frame member 400 and the second plate 380. In such a case, the portion exposed to be visible through the side surface (e.g., the side surface 210C in FIG. 2A) of the electronic device 300 may include the conductive part 311 and/or the first non-conductive part 312.

According to an embodiment, the frame member 400 may be bonded to as least a portion of the side member 310 via the second non-conductive part 313, which may be an injection-molded element or a filler material for bonding (e.g., a cured-in-place gasket (CIPG)). For example, the metal conductive part 311 exposed at least partially to the outside may not be directly bonded to the ceramic frame member 400. According to an embodiment, the frame member 400 and the conductive part 311 of the side member 310 may be bonded via the second non-conductive part 313. According to an embodiment, the frame member 400 may be bonded to the side member 310 via injection-molding through the second non-conductive part 313. In some embodiments, all of the conductive part 311, the first non-conductive part 312 coupled to the conductive part 311, and the frame member bonded to at least a portion of the conductive part 311 and/or the first non-conductive part 312 via the second conductive part 313 may be referred to as the side member 310. According to an embodiment, the frame member 400 may be disposed in at least a portion of the side surface 3103 of the electronic device 300 to be utilized as a decoration member (e.g., decoration surface). For example, the frame member 400 may be at least a portion of the side surface (e.g., the side surface 210C in FIG. 2A) of the electronic device 300.

Figure 4A:
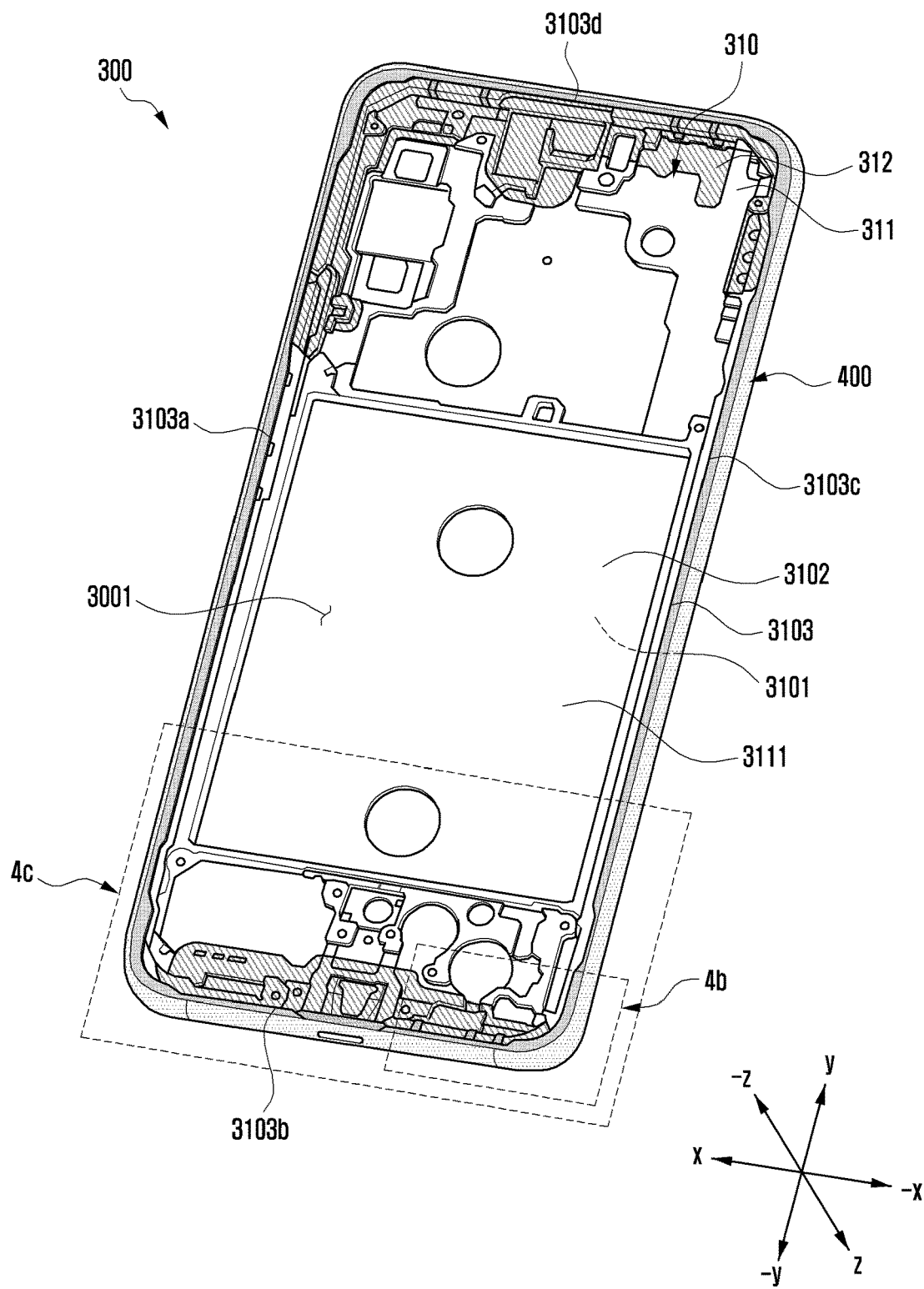
FIG. 4A is a perspective view of a side member to which a frame member according to an embodiment of the disclosure is coupled.
Figure 4B:
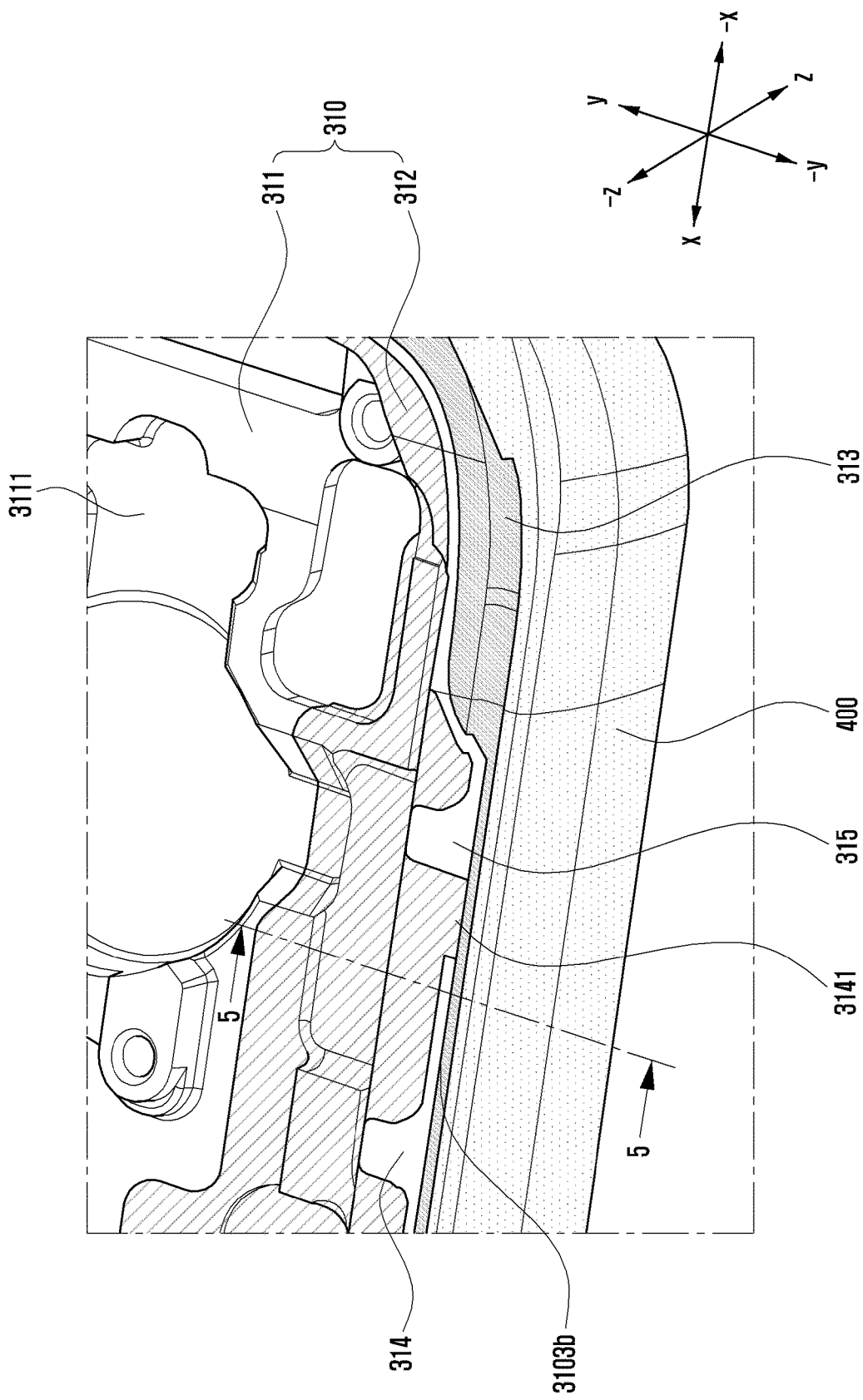
FIG. 4B is an enlarged view of area 4b in FIG. 4A according to an embodiment of the disclosure.
Figure 4C:
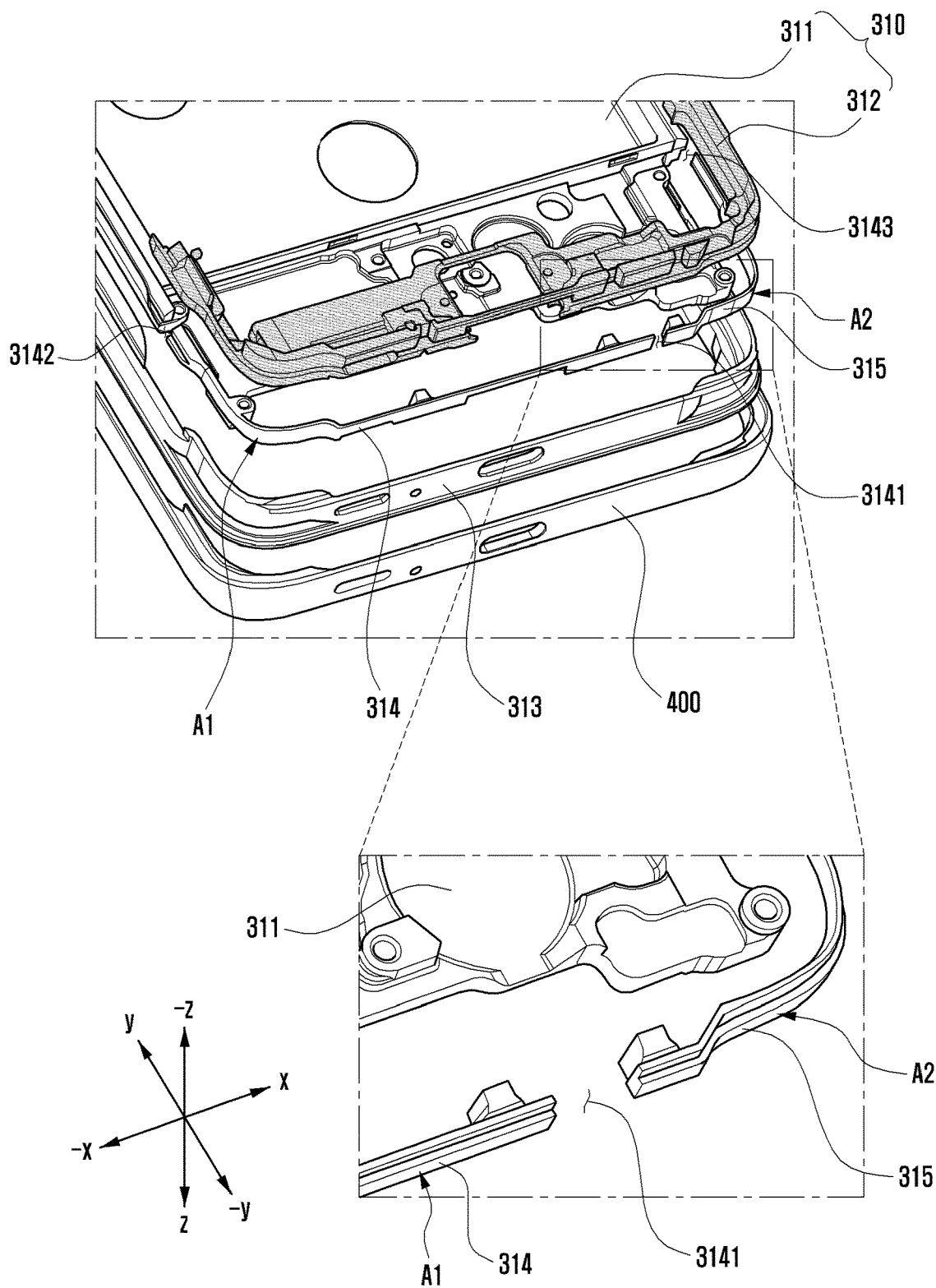
FIG. 4C is an exploded perspective view of a region 4C in the side member of FIG. 4A according to an embodiment of the disclosure.

According to an embodiment, the electronic device 300 may include at least one conductive member (e.g., the first conductive member 314 or the second conductive member 315 in FIG. 4C) disposed between the frame member 400 and the first non-conductive part 312 of the side member 310 and electrically connected to a wireless communication circuit (e.g., the wireless communication module 192 of FIG. 1) disposed in the internal space (e.g., the internal space 3001 in FIG. 4A) of the electronic device 300 to be used as at least one antenna (e.g., the first antenna A1 or the second antenna A2 in FIG. 4C) that transmits or receives wireless signals. According to an embodiment, the at least one conductive member (e.g., the first conductive member 314 or the second conductive member 315 in FIG. 4C) may be disposed to be at least partially supported by the first non-conductive part 312. According to an embodiment, the at least one conductive member (e.g., the first conductive member 314 or the second conductive member 315 in FIG. 4C) may be disposed to be at least partially supported by the second non-conductive part 313.

According to certain embodiments of the disclosure, the at least one conductive member (e.g., the first conductive member 314 or the second conductive member 315 in FIG. 4C) used as the antenna (e.g., the first antenna A1 or the second antenna A2 in FIG. 4C) may have shape and arrangement structure that are capable of providing sufficient separation distance with respect to at least one conductive structure (e.g., display, USB connector port, camera module, or conductive bracket) disposed in the internal space (e.g., the internal space 3001 in FIG. 4A) of the electronic device 300 between the side member 310 and the frame member 400, thereby helping to suppress the degradation of radiation performance.

Hereinafter, the arrangement structure of at least one conductive member disposed in the electronic device 300 that is used as an antenna will be described in detail.

FIG. 4A is a perspective view of a side member to which a frame member according to an embodiment of the disclosure is coupled. FIG. 4B is an enlarged view of area 4b in FIG. 4A according to an embodiment of the disclosure. FIG. 4C is an exploded perspective view of a region 4C in the side member of FIG. 4A according to an embodiment of the disclosure.

Referring to FIGS. 4A to 4C, the electronic device 300 may include a side member 310 including a first surface 3101, a second surface 3102 facing away from the first surface 3101, and a side surface 3103 surrounding the space between the first surface 3101 and the second surface 3102 and a ceramic frame member 400 disposed along at least a portion of the side surface 3103 of the side member 310. In some embodiments, the frame member 400 may be made of various materials capable of being bonded to the conductive part 311 of the side member 310 via the second non-conductive part 313. According to an embodiment, the side surface 3103 may include a first side surface 3103a having a first length in a predetermined direction (e.g., the y-axis direction), a second side surface 3103b extending from the first side surface 3103a in a perpendicular direction (e.g., the −x-axis direction) and having a second length smaller than the first length, a third surface 3103c extending from the second side surface 3103b in a direction (e.g., the y-axis direction) substantially parallel to the first side surface 3103a and having the first length, and a fourth side surface 3103d extending from the third side surface 3103c to the first side surface 3103a and having the second length. According to an embodiment, the electronic device 300 may include a support member 3111 extending from the side member 310 into the internal space 3001. According to an embodiment, the support member 3111 may be integrated with the side member 310, or may be a separate component that is coupled to the side member 310. In some embodiments, the support member 3111 may be a component included in the side member 310.

According to an embodiment, the side member 310 may include a conductive part 311 and a first non-conductive part 312 coupled to the conductive part 311. For example, the first non-conductive part 312 may be formed through injection molding. According to an embodiment, at least a portion of the conductive part 311 and/or at least a portion of the first non-conductive part 312 may be provided to implement the side surface 3103. According to an embodiment, the electronic device 300 may include the ceramic frame member 400 bonded along the side surface 3103 of the side member 310 via the second non-conductive part 313. According to an embodiment, the frame member 400 may be bonded to the side member 310 via the second non-conductive part 313 through injection-molding. For example, the second non-conductive part 313 may be disposed between at least the conductive part 311 of the side member 310 and the frame member 400. According to an embodiment, at least a portion of the second non-conductive part 313 may be visible from the exterior of the electronic device 300, while the remaining portion of the second non-conductive part 313 may be invisible. According to an embodiment, the first non-conductive part 312 and the second non-conductive part 313 may be made of substantially the same material. In some embodiments, the first non-conductive part 312 and the second non-conductive part 313 may be made of different materials.

According to an embodiment, the electronic device 300 may include one or more conductive members 314 and 315 disposed between the first non-conductive part 312 and the frame member 400 and used as one or more antennas A1 and A2. According to an embodiment, the one or more conductive members 314 and 315 may include a first conductive member 314 and/or a second conductive member 315 disposed to be spaced apart from the conductive part 311 via one or more segmented portions 3141, 3142, and 3143 and the first non-conductive part 312. According to an embodiment, the one or more conductive members 314 and 315 may operate as at least one antenna in at least one predetermined frequency band (e.g., a frequency band in the range of about 600 MHz to 6000 MHz) by being electrically connected to a wireless communication circuit (e.g., the wireless communication module 192 in FIG. 1) disposed in the internal space 3001 of the electronic device 300. According to an embodiment, the one or more conductive members 314 and 315 may include a first conductive member 314 created by the first segmented portion 3141 and the second segmented portion 3142 disposed to be spaced apart from the first segmented portion 3141, and used as the first antenna A1. According to an embodiment, the first conductive member 314 may be disposed at a position corresponding to at least a portion of the first side surface 3103a and/or the second side surface 3103b of the side member 310. According to an embodiment, the one or more conductive members 314 and 315 may include a second conductive member 315 created by the first segmented portion 3141 and the third segmented portion 3143 disposed to be spaced apart from the first segmented portion 3141, and used as the second antenna A2. According to an embodiment, the second conductive member 315 may be disposed at a position corresponding to at least a portion of the third side surface 3103c and/or the second side surface 3103b of the side member 310. According to an embodiment, one or more segmented portion 3141, 3142, and 3143 may be filled with the first non-conductive part 312 and/or the second non-conductive part 313. In some embodiments, the one or more conductive members 314 and 315 may be disposed to implement at least one of the first side surface 3103a, the second side surface 3103b, the third side surface 3103c, or a fourth side surface 3103d of the side member 310. According to an embodiment, the wireless communication circuit (e.g., the wireless communication module 192 in FIG. 1) may be configured to transmit or receive wireless signals in a first frequency band (e.g., low band) via the first antenna A1. According to an embodiment, the wireless communication circuit (e.g., the wireless communication module 192 in FIG. 1) may be configured to transmit or receive wireless signals in a second frequency band (e.g., mid-band or high band) that is different from the first frequency band via the second antenna A2. According to an embodiment, the one or more conductive members 314 and 315 may be made of substantially the same metal material as the conductive part 311 of the side member 310. According to some embodiments, the one or more conductive members 314 and 315 may be made of a metal material different from that of the conductive part 311 of the side member 310.

According to an embodiment, the one or more conductive members 314 and 315 may have a plate-type pattern shape, and may be at least partially coupled to the first non-conductive part 312 when the first non-conductive part 312 is injection-molded into the conductive part 311. In some embodiments, the one or more conductive members 314 and 315 may include at least one conductive pattern made by laser direct structuring (LDS) in the first non-conductive part 312 provided as a portion of the side member 310. According to an embodiment, the one or more conductive members 314 and 315 and/or one or more segment portions 3141, 3142, and 3143 may be disposed to be exposed to the side surface of the side member 310. In this case, the one or more conductive members 314 and 315 and the one or more segmented portions 3141, 3142, and 3143 exposed through the side surface 3103 are covered by the frame member 400 so as to be not visible from the exterior of the electronic device 300, which may improve the aesthetic appearance of the electronic device 300. As another example, the frame member 400 made of a high-strength ceramic material and disposed along the side surface 3103 of the side member 310 may help to reinforce the rigidity of the electronic device 300. As another example, the conductive part 311 of the side member 310 provided for reinforcing rigidity is covered by the frame member 400 to be invisible. Because the conductive part 311 is invisible, it need not be treated with an expensive surface treatment process, and thus it may be possible to reduce production costs.

According to an exemplary embodiment of the disclosure, the one or more conductive members 314 and 315 may be covered by a step or stepped structure for providing sufficient separation distance with respect to a conductive structure (e.g., the display 330 in FIG. 5) disposed in the internal space 3001 of the electronic device 300. Accordingly, the radiation performance of the one or more antennas A1 and A2 may be improved through the arrangement structure of the one or more conductive members 314 and 315 arranged with a separation distance.

Hereinafter, the shape and arrangement structure of the one or more conductive members 314 and 315 will be described in detail.

Figure 5:
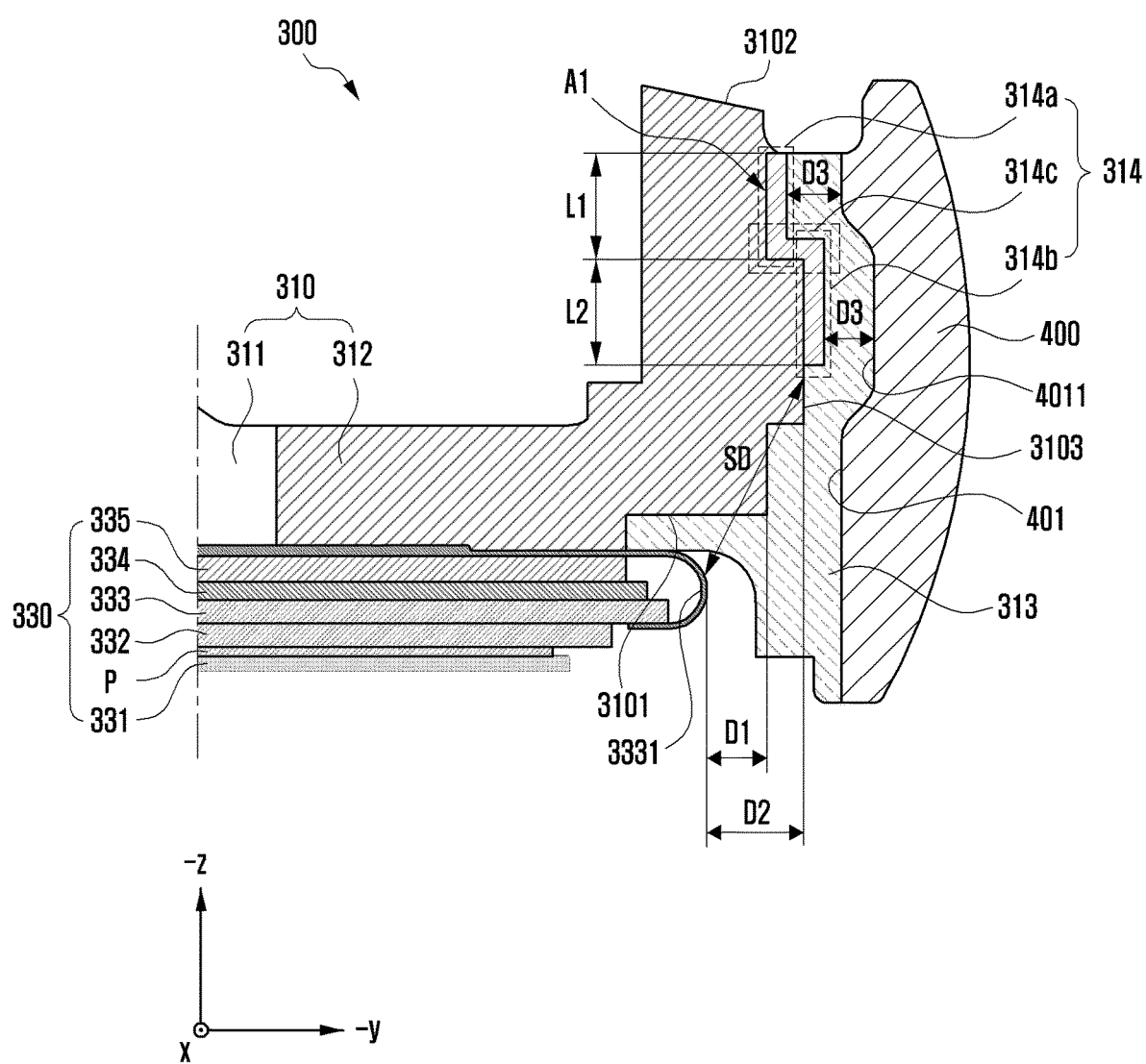
FIG. 5 is a partial cross-sectional view of the side member to which a frame member is coupled, taken along line 5-5 in FIG. 4B, according to an embodiment of the disclosure.

FIG. 5 is a partial cross-sectional view of the side member to which a frame member is coupled, taken along line 5-5 in FIG. 4B, according to an embodiment of the disclosure.

In the description of FIG. 5, although the shape and arrangement structure of the first conductive member are described, it is apparent that the shape and arrangement structure of the second conductive member may also be substantially the same as those of the first conductive member.

Referring to FIG. 5, the electronic device 300 may include a side member 310 including a first surface 3101, a second surface 3102 substantially facing away from the first surface 3101, and a side surface 3103 surrounding the space between the first surface 3101 and the second surface 3102 and a ceramic frame member 400 disposed along at least a portion of the side surface 3103 of the side member 310. According to an embodiment, the side member 310 may include a conductive part 311 and a first non-conductive part 312 coupled to the conductive part 311 through injection molding. According to an embodiment, the ceramic frame member 400 may be bonded to the side member 310 via the second non-conductive part 313. According to an embodiment, the frame member 400 may be bonded to at least a portion of the side surface of the side member 310 through injection mold using the second non-conductive part 313.

According to an embodiment, the electronic device 300 may include a display 330 disposed to be supported by the first surface 3101. According to an embodiment, the display 330 may include a protective layer 331 (e.g., window layer), an adhesive layer P, a polarizer 332 (e.g., polarizing film), a display panel 333, a polymer member 334, and/or a metal sheet layer 335. According to an embodiment, the adhesive layer P is illustrated to be disposed between the protective layer 331 and the polarizer 332, but the adhesive layer P may be disposed between the polarizer 332 and the display panel 333, between the display panel 333 and the polymer member 334, or between the polymer member 334 and the metal sheet layer 335, respectively. According to an embodiment, the adhesive member P may include at least one of an optical clear adhesive (OCA), a pressure-sensitive adhesive (PSA), a heat-responsive adhesive, a general adhesive, or a double-sided tape. According to an embodiment, the protective layer 331 may include a polymer layer and/or a glass layer laminated with the polymer layer. According to an embodiment, the protective layer 331 may include polyethylene terephthalate (PET) or polyimide (PI) as a polymer layer, and may include ultra-thin glass (UTG) as a glass layer. According to an embodiment, the protective layer 331 may be configured with a glass layer (e.g., UTG) and a polymer layer (PET or PI) that is laminated on the glass layer and corresponds to an external environment. According to an embodiment, the polarizer 332 may be replaced with a color filter and a black matrix (BM). According to an embodiment, the polymer member 334 may implement a cushion for preventing damage and/or damage to the display 330 by absorbing an impact from the exterior of the electronic device 300. In some embodiments, the polymer member 334 may be disposed below the metal sheet layer 335. According to an embodiment, the metal sheet layer 335 may help to reinforce rigidity of the electronic device 300. According to an embodiment, the metal sheet layer 335 may block electrical noise generated around the electronic device 300. The metal sheet layer 335 may be used to dissipate heat emitted from a heat emitting component (e.g., the processor 120 and/or the memory 130 in FIG. 1) mounted on the board (e.g., the board 340 in FIG. 3). The metal sheet layer 335 may be made with at least one of, for example, steel use stainless (SUS) (e.g., stainless steel (STS)), Cu, Al, or CLAD (e.g., a stacking member in which SUS and A1 are alternately disposed). In some embodiments, the metal sheet layer 335 may include other alloy materials. According to an embodiment, the display 330 may further include a detection member (not illustrated) for detecting inputs generated via electromagnetic induction from a writing member (e.g., stylus pen). For example, the detection member may include a digitizer. The detection member (e.g., digitizer) may be disposed between the display panel 333 and the polymer member 334. In another embodiment, the detection member may be disposed under the metal sheet layer 335, and the metal sheet layer 335 may have a structural shape (e.g., having a plurality of openings) that can be used to detect signals (e.g., resonant frequency) of the electronic pen by the detection member. According to an embodiment, the display 330 may include at least one functional member (not illustrated) disposed between the polymer member 334 and the metal sheet layer 335. For example, the functional member may include a graphite sheet for heat dissipation, a force touch FPCB, a fingerprint sensor FPCB, an antenna radiator for communication, a heat dissipation sheet, a conductive/non-conductive tape, and/or an open cell sponge.

According to an embodiment, the electronic device 300 may include a first conductive member 314 disposed between the first non-conductive part 312 and the frame member 400. According to an embodiment, at least a portion of the first conductive member 314 may be fixed by at least a portion of the first non-conductive part 312, which is coupled to the conductive part 311 via primary injection molding. According to an embodiment, the first conductive member 314 may be fixed by the first non-conductive part 312 to be at least partially exposed through the side surface 3103, wherein the exposed portion may be further fixed by the second non-conductive part 313, which is bonding the first non-conductive part 312 and the frame member 400 to each other via secondary injection molding.

According to an embodiment, the display panel 333 may include a bent portion 3331 (e.g., chip-on-panel (COP) or chip-on-film (COF)) which extends from the display panel 333 to the rear surface of the display 330 and on which a display drive circuit (e.g., display driver IC (DDI)) is disposed. According to an embodiment, since the bent portion 3331 protrudes from an end of the display 330 laterally (e.g., in the −y-axis direction), the radiation performance of the first conductive member 314 disposed near the side surface 3103 and used as the first antenna A1 may be degraded. According to an embodiment, the radiation performance of the first conductive member 314 used as the first antenna A1 may be degraded due to interference between the metal sheet layer 335 included in the display 330 and the first conductive member 314 near the display 330. Accordingly, the first conductive member 314 needs to be disposed to have a sufficient separation distance from the bent portion 3331 and/or the metal sheet layer 335.

According to an embodiment, the first conductive member 314 may include a first portion 314a disposed close to the second surface 3102 and having a first length L1 extending in a first direction (e.g., the z-axis direction) and a second portion 314b disposed closer to the first surface 3101 than the first portion 314a and having a second length L2 in the first direction (e.g., the z-axis direction). The first portion 314a and the second portion 314b may be connected through a stepped portion 314c. According to an embodiment, the first length L1 and the second length L2 may be substantially equal to each other. In some embodiments, the first length L1 and the second length L2 may be different from each other. According to an embodiment, the first portion 314a, the second portion 314b, and the stepped portion 314c may be configured to be integrated with one another. According to an exemplary embodiment, the stepped portion 314c may extend in a second direction (e.g., the −y-axis direction) substantially perpendicular to the first direction (e.g., the z-axis direction). In some embodiments (not shown), the stepped portion 314c may extend to be inclined in the second direction (e.g., the −y-axis direction) with respect to the first direction (e.g., the z-axis direction) at a predetermined angle (e.g., in a ±acute angle range). According to an embodiment, the first conductive member 314 may be disposed in the second direction (e.g., the −y-axis direction) substantially perpendicular to the first direction (e.g., the z-axis direction) such that a first horizontal distance D1 between the bent portion 3331 and the first portion 314a is smaller than a second horizontal distance D2 between the bent portion 3331 and the second portion 314b. For example, the first conductive member 314 may help to suppress the degradation of radiation performance of the first antenna A1 by the bent portion 3331 since the first conductive member 314 is disposed such that the second portion 314b, which is relatively closer to the bent portion 3331 in the first direction (e.g., the z-axis direction), has greater separation distance than the first portion 314a in the second direction (e.g., the −y-axis direction).

For example, as shown in <Table 1> below, it can be seen that, even if the first horizontal distance D1 is changed, the conductive members 314 and 315, implemented in the form of steps according to an embodiment of the disclosure, are better in radiation efficiency than conventional conductive members (e.g., having a linear shape).

TABLE 1

| Peak Rad. Eff. [dB] | A1 | | A2 | |
| --- | --- | --- | --- | --- |
| | Existing | Disclosure | Existing | Disclosure |
| D1 = 0 mm | −7.0 | −6.0 | −5.3 | −4.9 |
| D1 = 0.2 mm | −6.2 | −5.5 | −4.7 | −4.3 |
| D1 = 0.4 mm | −5.5 | −5.0 | −4.2 | −3.7 |
| D1 = 0.6 mm | −5.1 | −4.6 | −3.8 | −5.1 |

According to an embodiment, the radiation performance of the first antenna A1 of the first conductive member 314 may be determined depending on the shortest distance SD between the second portion 314b and the bent portion 3331. For example, the degradation of radiation performance of the first conductive member 314 may be suppressed as the shortest distance SD increases.

According to an embodiment, since the second portion 314b of the first conductive member 314 is disposed closer to the frame member 400 than the first portion 314a, the distance between the second portion 314b and the frame member 400 is relatively reduced. In such a reduced distance, injected material may not be smoothly introduced during the injection molding process for forming the second non-conductive part 313, and thus the probability that a defective product will be generated may increase. In order to solve this problem, the frame member 400 may include a recess 4011 (e.g., groove) provided on the inner surface 401 in a portion corresponding to the second portion 314b of the first conductive member 314. Accordingly, the frame member 400 and the first conductive member 314 may contribute to a smooth injection process since substantially the same separation distance D3 is maintained using the recess 4011 even when the first portion 314a and the second portion 314b are disposed at different positions in the second direction (e.g., the −y-axis direction). According to an embodiment, the predetermined distance D3 may be set to at least about 6 mm.

Figure 6A:
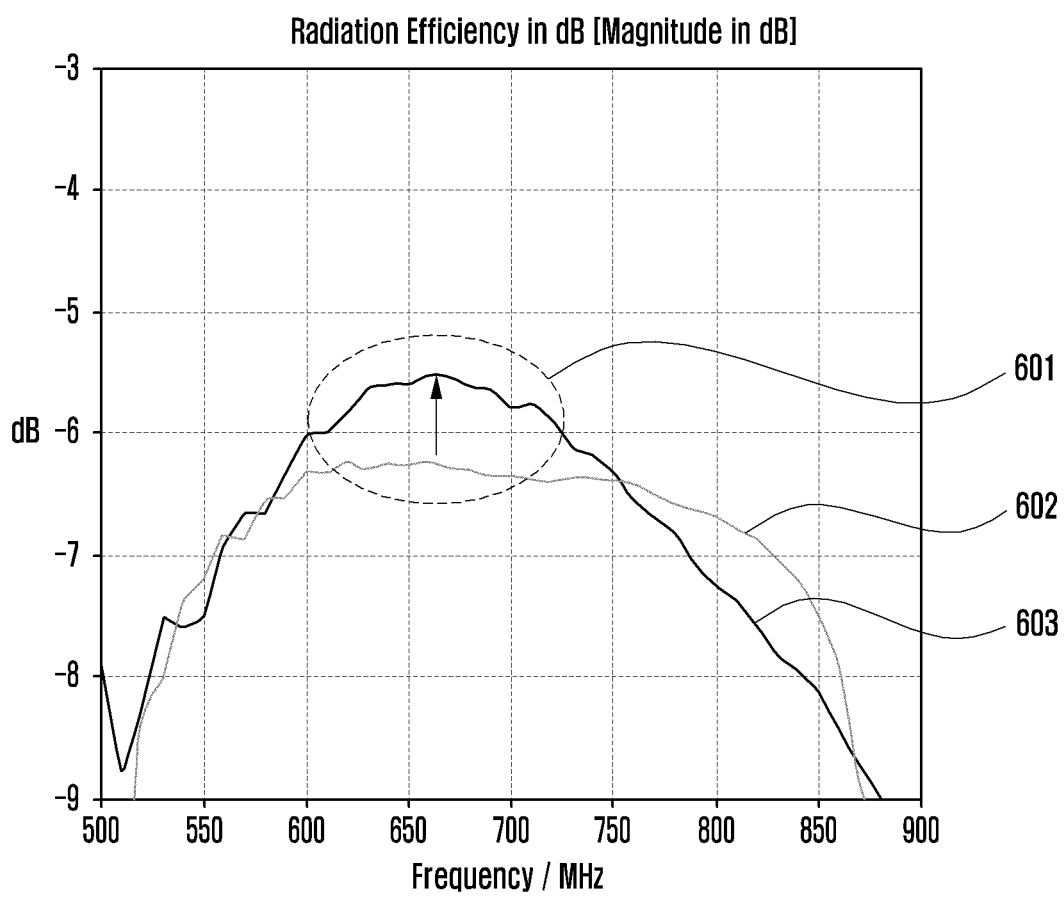
FIG. 6A is a graph showing the radiation performances of a conventional antenna and the first antenna of FIG. 4C according to an embodiment of the disclosure in comparison.

FIG. 6A is a graph showing the radiation performances of a conventional antenna and the first antenna of FIG. 4C according to an embodiment of the disclosure in comparison.

Referring to FIG. 6A, it can be seen that, in the first frequency band (area 601) (e.g., low band), the radiation efficiency through the step-shaped first conductive member 314 according to an embodiment of the present disclosure is improved by about 0.7 dB than the radiation efficiency of a conventional conductive member (e.g., having a linear shape) (graph 602).

Figure 6B:
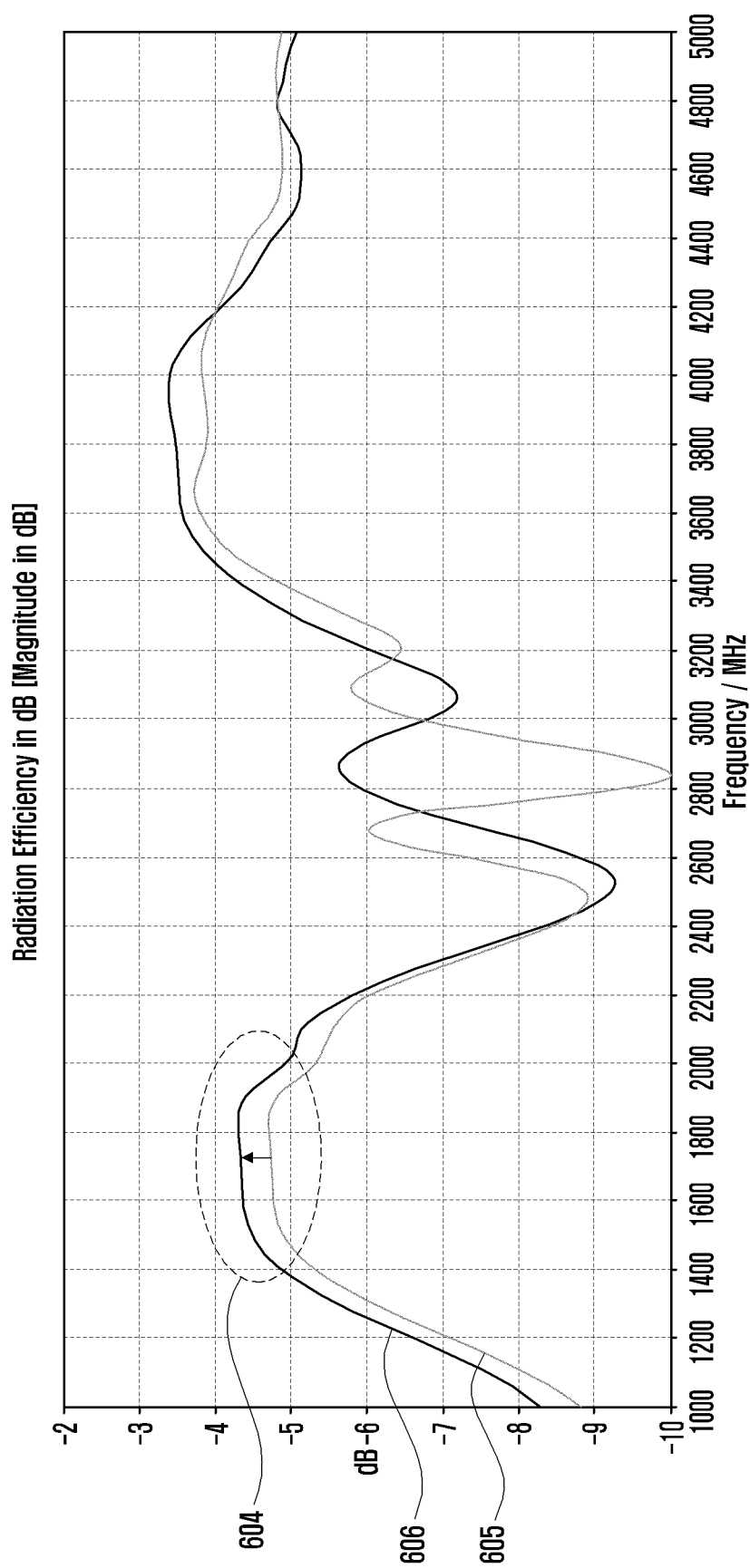
FIG. 6B is a graph showing the radiation performances of a conventional antenna and the second antenna of FIG. 4C according to an embodiment of the disclosure in comparison.

FIG. 6B is a graph showing the radiation performances of a conventional antenna and the second antenna of FIG. 4C according to an embodiment of the disclosure in comparison.

Referring to FIG. 6B, it can be seen that, in the first frequency band (area 604) (e.g., mid-band), the radiation efficiency through the step-shaped second conductive member 315 according to an embodiment of the present disclosure is improved by about 0.4 dB than the radiation efficiency of a conventional conductive member (e.g., having a linear shape) (graph 605).

Figure 7A:
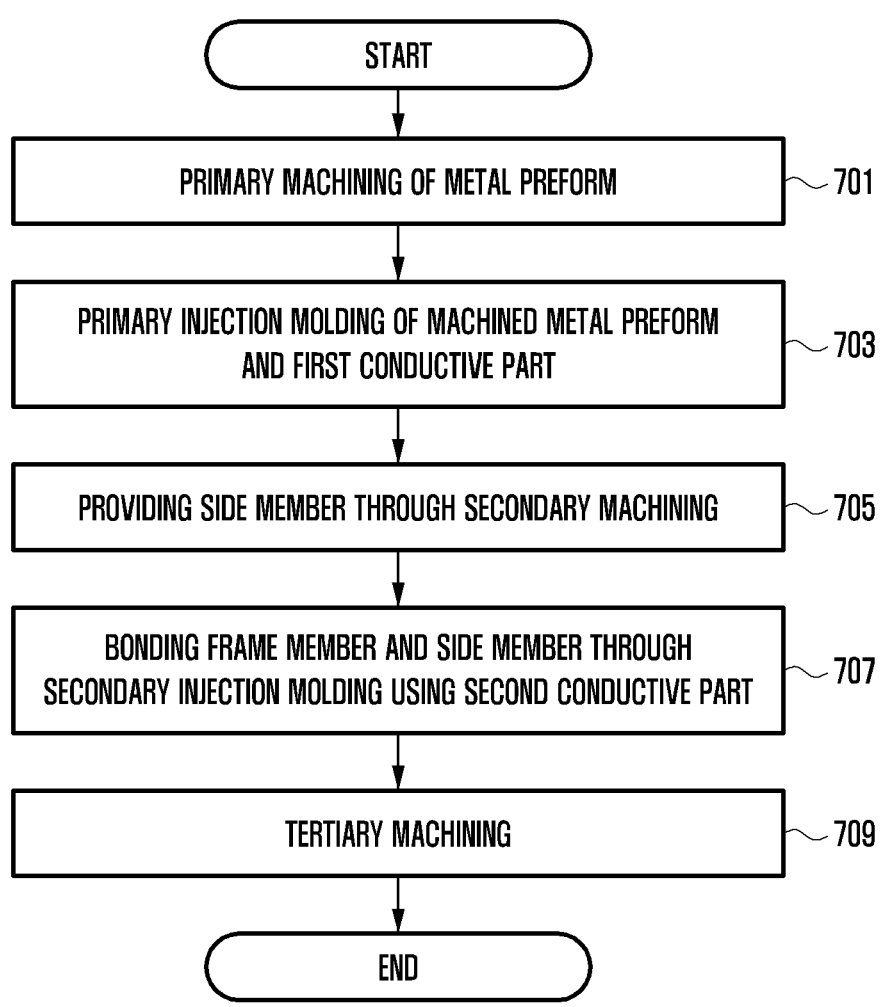
FIG. 7A is a flowchart illustrating process operations for bonding a side member and a frame member according to an embodiment of the disclosure.
Figure 7B:
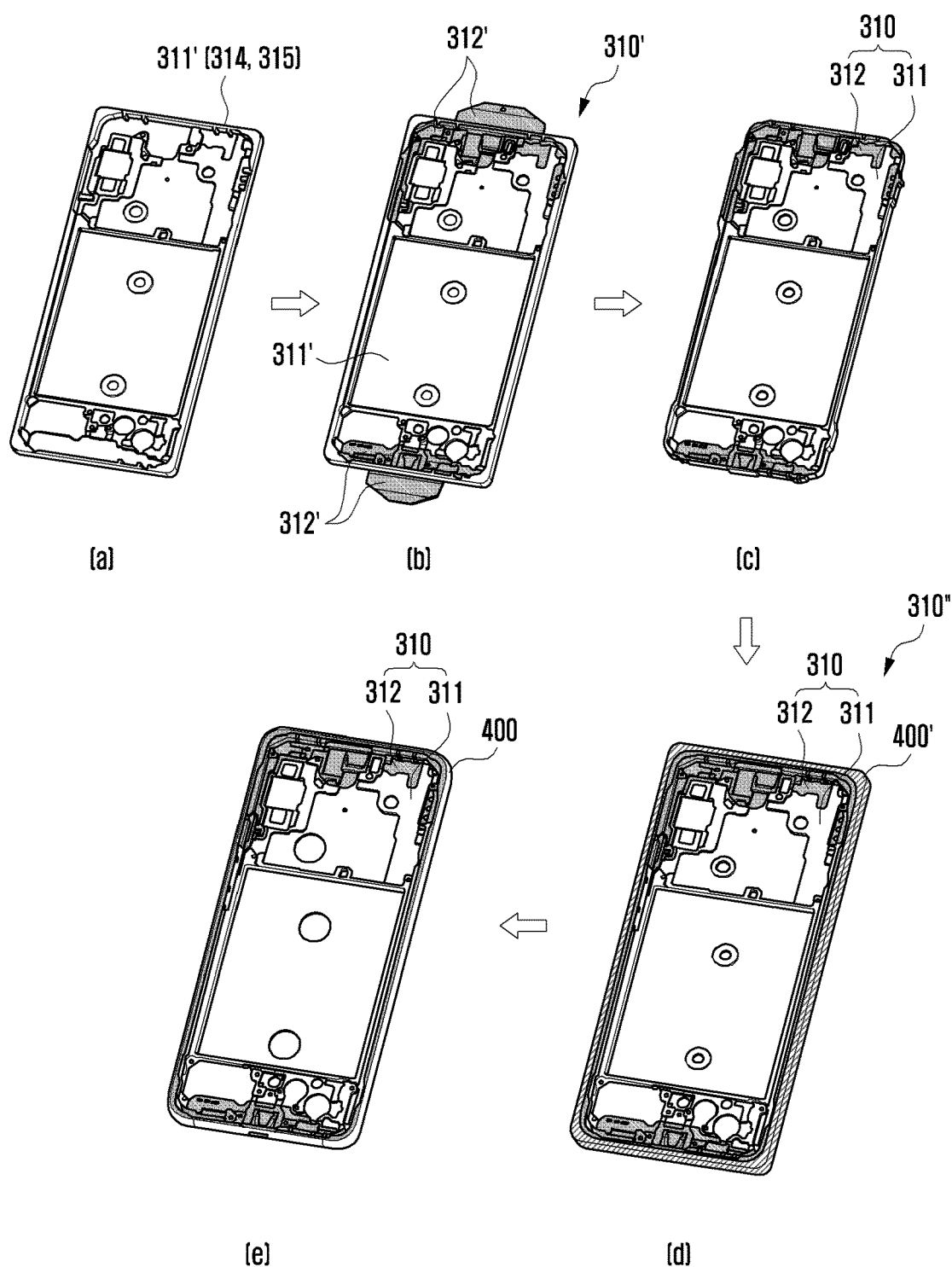
FIG. 7B is a schematic view illustrating process operations for bonding a side member and a frame member according to an embodiment of the disclosure.

FIG. 7A is a flowchart illustrating process operations for bonding a side member and a frame member according to an embodiment of the disclosure. FIG. 7B is a schematic view illustrating process operations for bonding a side member and a frame member according to an embodiment of the disclosure.

Referring to FIGS. 7A and 7B, in operation 701, primary machining may be performed after a metal preform is provided. According to an embodiment, the metal preform may include a preform made of a 6XXX series or 7XXX (series aluminum alloy. According to an embodiment, the metal preform may include extruded material manufactured through an extrusion process and/or rolled material manufactured through a rolling process. In some embodiments, the metal preform may include die-casting material made of a magnesium alloy or an aluminum alloy. According to an embodiment, the metal preform may be the primary workpiece 311' illustrated in (a) of FIG. 7B. According to an embodiment, the primary workpiece 311' may be formed through a plurality of pressing processes (e.g., bending process, punching process, or piercing process) of a heat-treated metal preform.

According to an embodiment, in operation 701, the first conductive member 314 and/or the second conductive member 315 to be used as one or more antennas may also be provided through primary machining. In another embodiment, the primary workpiece 311' may be formed through a die-casting process using a die-casting material. As another embodiment, the primary workpiece 311' may be formed to have a predetermined shape through CNC machining.

According to an embodiment, in operation 703, the primary workpiece 311' may be coupled to a primary injection-molded product 312' as illustrated in (b) of FIG. 7B through primary injection molding using a mold to form a secondary workpiece 310'. According to an embodiment, the secondary workpiece 310' may be formed using a resin injected through an injection mold of a hot runner type or a cold runner type. In some embodiments, the secondary workpiece 310' may be formed through a side gate method.

According to an embodiment, in operation 705, the secondary workpiece 310' may be formed as a side member 310 including a conductive part 311 and a first non-conductive part 312 as illustrated in (c) of FIG. 7B, through secondary machining (e.g., CNC machining). According to an embodiment, the side member 310 may be formed through secondary machining so as to provide an arrangement structure for the disposition of at least one electronic component in the internal space of the electronic device (e.g., the electronic device 300 in FIG. 3). In this case, the first conductive member (e.g., the first conductive member 314 in FIG. 4C) and/or the second conductive member (e.g., the second conductive member 315 in FIG. 4C) may be implemented as a portion of the side member 310 through primary injection molding. For example, the first conductive member (e.g., the first conductive member 314 in FIG. 4C) and the second conductive member (e.g., the second conductive member 315 in FIG. 4C) may be fixed to the first non-conductive part 312 coupled to the conductive part 311 through injection molding.

According to an embodiment, in operation 707, through secondary injection molding, as illustrated in (d) of FIG. 7B, a tertiary workpiece 310" in which the side member 310 and a frame preform 400' are coupled to each other may be formed. According to an embodiment, the first conductive member (e.g., the first conductive member 314 in FIG. 4C) and the second conductive member (e.g., the second conductive member 315 in FIG. 4C) may be disposed between the frame preform 400' and the side member 310 after the secondary injection molding. For example, the first conductive member (e.g., the first conductive member 314 in FIG. 4C) and the second conductive member (e.g., the second conductive member 315 in FIG. 4C) may be disposed between the first non-conductive part 312 formed through the first injection molding and the second non-conductive part (e.g., the second non-conductive part 313 in FIG. 5) formed through the secondary injection molding.

According to an embodiment, in operation 709, the tertiary workpiece 310" may be bonded along the periphery of the side member 310 as illustrated in (e) of FIG. 7B through tertiary machining (e.g., CNC machining and/or milling machining) and may be formed in a shape corresponding to the exterior (e.g., the side surface 210C in FIG. 2A) of the electronic device (e.g., the electronic device 200 in FIG. 2A). Accordingly, the first conductive member (e.g., the first conductive member 314 in FIG. 4C) and the second conductive member (e.g., the second conductive member 315 in FIG. 4C) may be invisible from the exterior because the frame member 400 formed through the tertiary machining of the ceramic frame preform 400' covers them.

FIGS. 8A to 8F are partial cross-sectional views of an electronic device illustrating an arrangement structure of a conductive member used as an antenna between a frame member and a side member according to certain embodiments of the disclosure.

In describing the electronic device of FIGS. 8A to 8F, the same reference numerals are assigned to components substantially the same as those of the electronic device of FIG. 5, and detailed description thereof may be omitted.

Figure 8A:
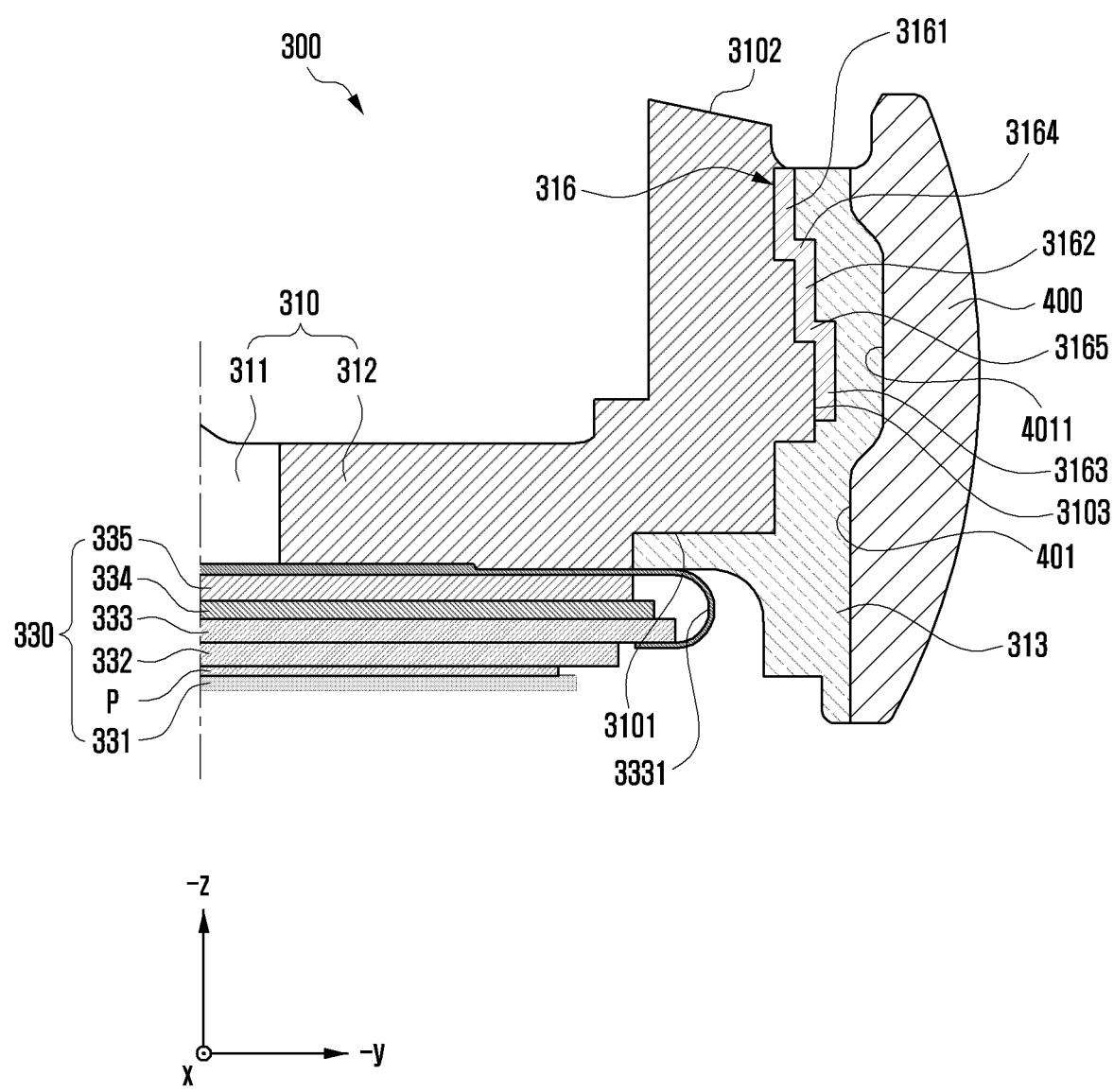
FIGS. 8A to 8F are partial cross-sectional views of an electronic device illustrating an arrangement structure of a conductive member used as an antenna between a frame member and a side member according to certain embodiments of the disclosure.

Referring to FIG. 8A, the electronic device 300 may include a conductive member 316 disposed between the frame member 400 and the first non-conductive part 312 through the injection molding of the second non-conductive part 313. The conductive member 316 may operate as an antenna that transmits or receives wireless signals in a predetermined frequency band by being electrically connected to a wireless communication circuit (e.g., the wireless communication module 192 in FIG. 1) disposed in the electronic device 300. According to an embodiment, the conductive member 316 may include a first portion 3161, a second portion 3162, and a third portion 3163 each having a predetermined length in a first direction (e.g., the z-axis direction). According to an embodiment, the first portion 3161 may be connected to the second portion 3162 via a first stepped portion 3164 extending in a second direction (e.g., the −y-axis direction) substantially perpendicular to the first direction (e.g., the z-axis direction). According to an embodiment, the second part 3162 may be connected to the third part 3163 via a second stepped part 3165 extending in the second direction (e.g., the −y-axis direction). According to an embodiment, the first portion 3161, the second portion 3162, the third portion 3163, the first stepped portion 3164, and the second stepped portion 3165 may be integrated with each other. According to an embodiment, the first stepped portion 3164 and/or the second stepped portion 3165 may be formed to be inclined at a predetermined angle (e.g., ±acute angle) from the second direction (e.g., the −y-axis direction) with respect to the first direction (e.g., the z-axis direction). In some embodiments, the first stepped portion 3164 and the second stepped portion 3165 may be formed to be parallel to each other or non-parallel to each other. According to an embodiment, the frame member 400 may include a recess 4011 formed in the inner surface 401 thereof corresponding to the first stepped portion 3164, the second portion 3162, the second stepped portion 3165, and the third portion 3163 to maintain the distance between the conductive member 316 and the frame member 400 constant, thereby helping the smooth injection process of the second non-conductive part 313.

According to an embodiment, the conductive member 316 may be disposed to be farther away from the bent portion 3331 of the display 330, which is a conductive structure disposed in the electronic device 300, in the second direction (e.g., the −y-axis direction) when progressing from the first portion 3161 to the third portion 3163 via the second portion 3162, thereby helping to suppress the degradation of radiation performance of the antenna. Thus, as shown, in some embodiments, the conductive member 316 may include three or more stepped portions and four or more portions connected to each other via the stepped portions.

Figure 8B:
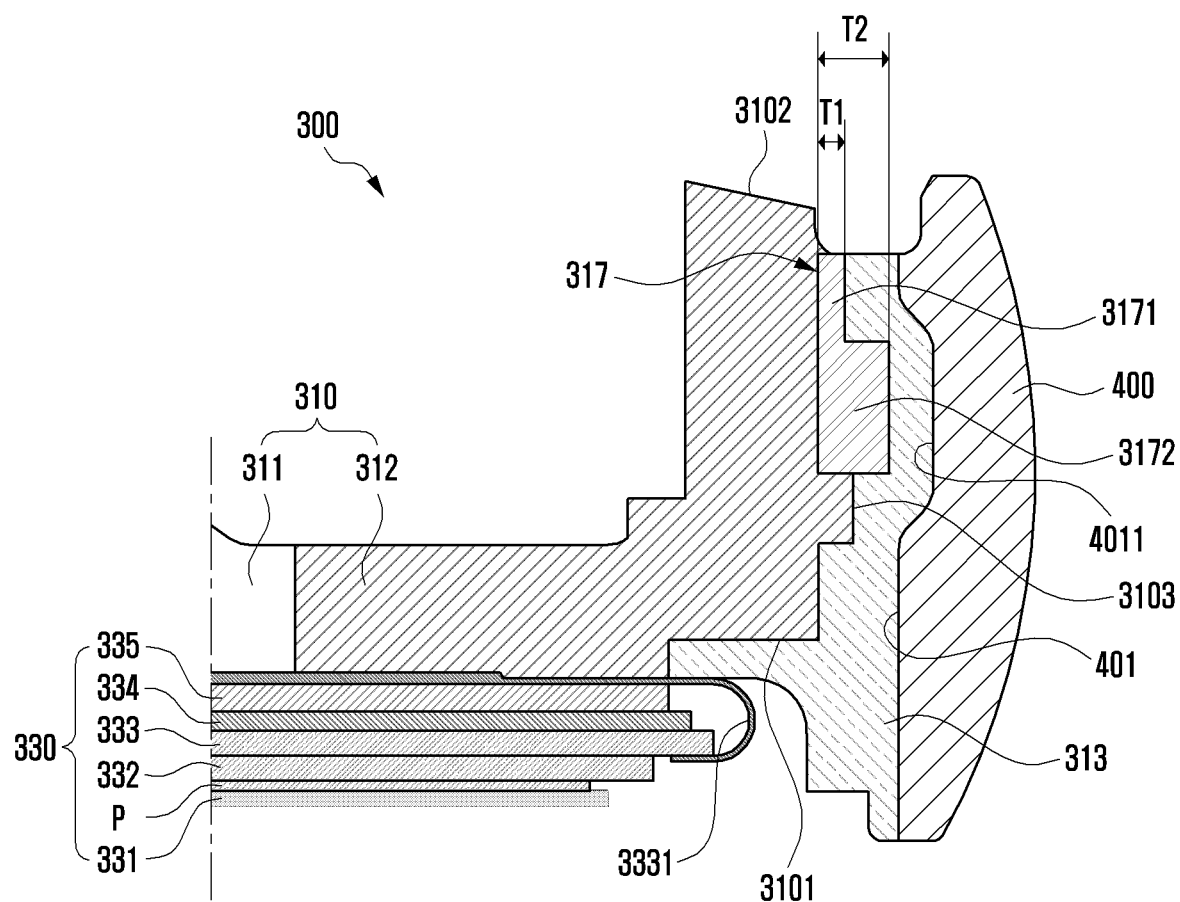

Referring to FIG. 8B, the electronic device 300 may include a conductive member 317 disposed between the frame member 400 and the first non-conductive part 312 through the injection molding of the second non-conductive part 313. According to an embodiment, the conductive member 317 may operate as an antenna that transmits or receives wireless signals in a predetermined frequency band by being electrically connected to a wireless communication circuit (e.g., the wireless communication module 192 in FIG. 1) disposed in the electronic device 300. According to an embodiment, the conductive member 317 may be disposed to have a predetermined length in the first direction (e.g., the z-axis direction). According to an embodiment, the conductive member 317 may include a first portion 3171 having a first thickness T1 and a second portion 3172 extending from the first portion 3171 and having a second thickness T2 greater than the first thickness T1. In some embodiments, the conductive member 317 may be formed to gradually increase in thickness when progressing in the first direction (e.g., the z-axis direction). According to an embodiment, the frame member 400 may include a recess 4011 formed in the inner surface 401 thereof corresponding to the second portion 3172 to maintain the distance between the conductive member 316 and the frame member 400 constant, thereby helping the smooth injection process of the second non-conductive part 313.

According to an embodiment, the conductive member 317 may have greater thickness when progressing in the first direction (e.g., the z-axis direction) to be closer to the bent portion 3331 of the display 330, which is a conductive structure. This way, the conductive member 317 is less sensitive to the bent portion 3331, thereby helping to suppress the degradation of radiation performance of the antenna.

Figure 8C:
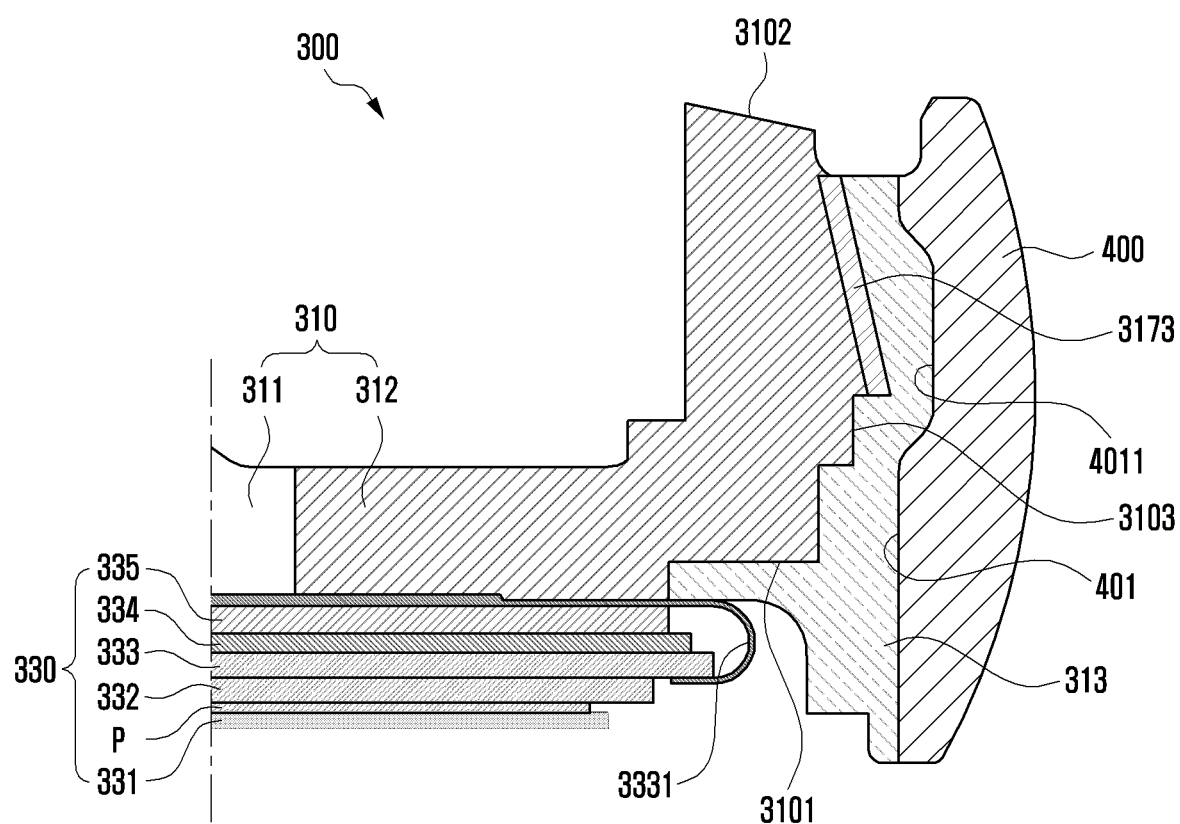

Referring to FIG. 8C, the electronic device 300 may include a conductive member 3173 disposed between the frame member 400 and the first non-conductive part 312 through the injection molding of the second non-conductive part 313. According to an embodiment, the conductive member 3173 may operate as an antenna that transmits or receives wireless signals in a predetermined frequency band by being electrically connected to a wireless communication circuit (e.g., the wireless communication module 192 in FIG. 1) disposed in the electronic device 300. According to an embodiment, the conductive member 3173 may be disposed to have a slope of a predetermined angle that approaches the frame member (e.g., in the −y-axis direction) with reference to the first direction (e.g., the z-axis direction). According to an embodiment, the conductive member 3173 may be disposed to be farther away from the bent portion 3331 when progressing in the first direction (e.g., the z-axis direction) to reduce interference with the bent portion 3331, thereby helping to suppress the degradation of radiation performance of the antenna.

Figure 8D:
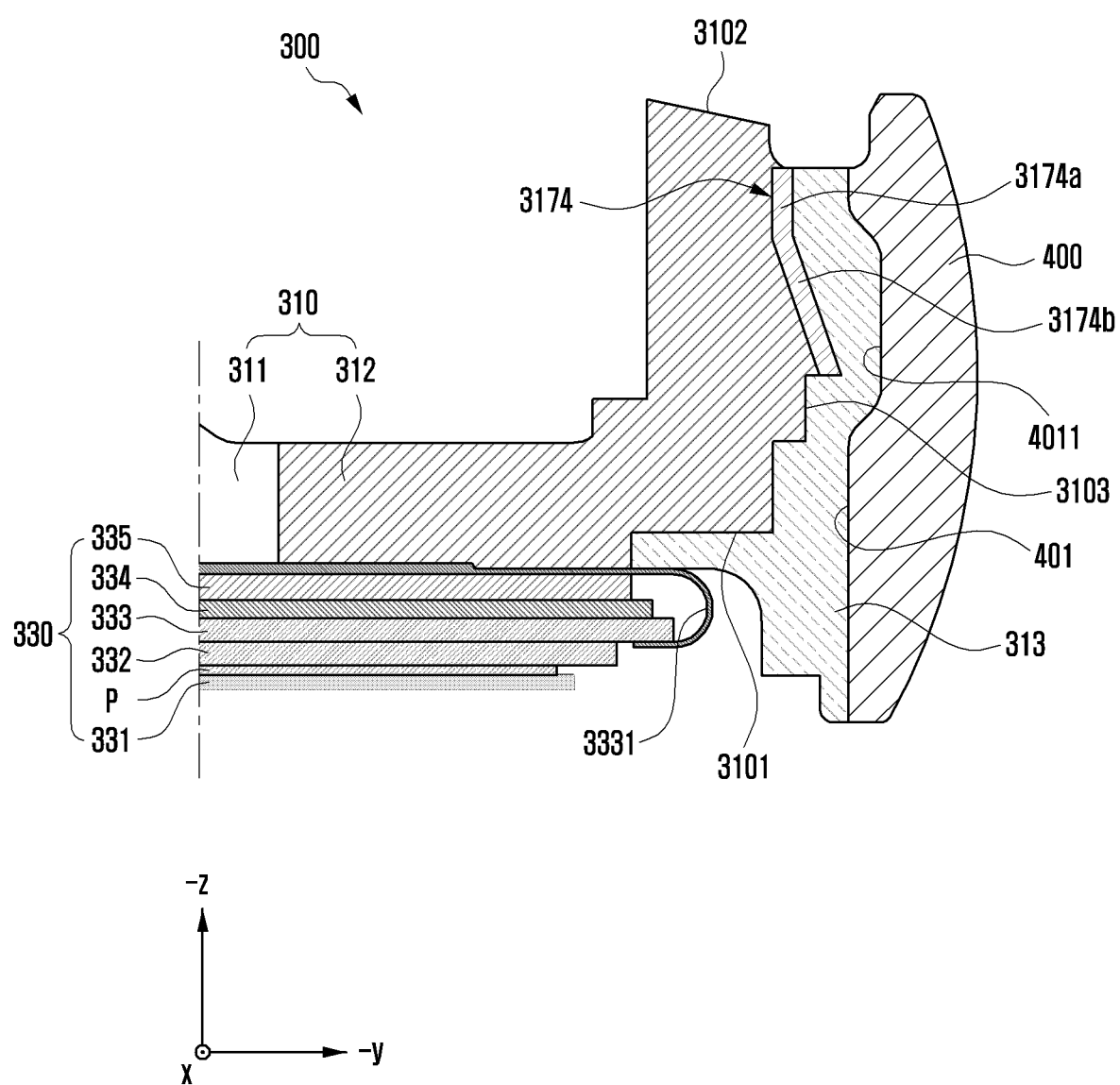

Referring to FIG. 8D, the electronic device 300 may include a conductive member 3174 disposed between the frame member 400 and the first non-conductive part 312 through the injection molding of the second non-conductive part 313. According to an embodiment, the conductive member 3174 may operate as an antenna that transmits or receives wireless signals in a predetermined frequency band by being electrically connected to a wireless communication circuit (e.g., the wireless communication module 192 in FIG. 1) disposed in the electronic device 300.

According to an embodiment, the conductive member 3174 may include a first portion 3174a disposed to have a predetermined length in the first direction (e.g., the z-axis direction) and a second portion 3174b extending from the first portion 3174a, and sloped to approach the frame member (e.g., in the −y-axis direction) with reference to the first direction (e.g., the z-axis direction). The second portion 3174b may have a slope of a predetermined angle. According to an embodiment, the conductive member 3174 may cause less interference with the bent portion 3331 because the second portion 3174b is disposed to be angled away from the bent portion 3331, thereby helping to suppress the degradation of radiation performance of the antenna.

Figure 8E:
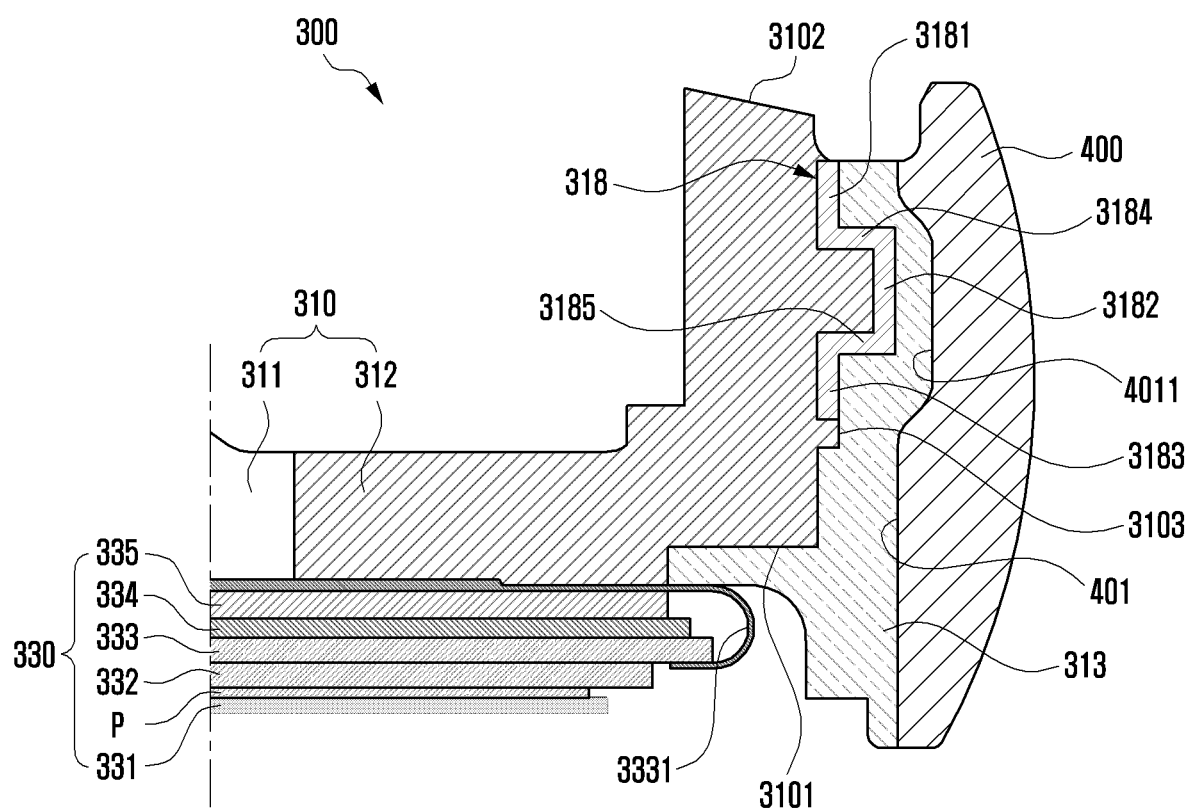

Referring to FIG. 8E, the electronic device 300 may include a conductive member 318 disposed between the frame member 400 and the first non-conductive part 312 through the injection molding of the second non-conductive part 313. The conductive member 316 may operate as an antenna that transmits or receives wireless signals in a predetermined frequency band by being electrically connected to a wireless communication circuit (e.g., the wireless communication module 192 in FIG. 1) disposed in the electronic device 300. According to an embodiment, the conductive member 318 may include a first portion 3181, a second portion 3182, and a third portion 3183 each having a predetermined length in a first direction (e.g., the z-axis direction). According to an embodiment, the first portion 3181 may be connected to the second portion 3182 via a first stepped portion 3184 extending in a second direction (e.g., the −y-axis direction) substantially perpendicular to the first direction (e.g., the z-axis direction). According to an embodiment, the second portion 3162 may be connected to the third portion 3183 via the second stepped portion 3185 extending in the third direction (e.g., the y-axis direction) opposite to the second direction (e.g., the −y-axis direction). According to an embodiment, the first portion 3181 and the second portion 3182 may be disposed on to be co-linear in the first direction (e.g., the z-axis direction) or may be disposed to be not co-linear. According to an embodiment, the first portion 3181, the second portion 3182, the third portion 3183, the first stepped portion 3184, and the second stepped portion 3185 may be integrated with each other. According to an embodiment, the first stepped portion 3184 and/or the second stepped portion 3185 may be formed to be inclined at a predetermined angle (e.g., ±acute angle) from the second direction (e.g., the −y-axis direction). In some embodiments, the first stepped portion 3184 and the second stepped portion 3185 may be formed to be parallel to each other or non-parallel to each other. According to an embodiment, the frame member 400 may include a recess 4011 formed in the inner surface 401 thereof corresponding to the first stepped portion 3184, the second portion 3182, and the second stepped portion 3185 to maintain the distance between the conductive member 318 and the frame member 400 constant, thereby helping smooth injection process of the second non-conductive part 313. In some embodiments, the conductive member 318 may include three or more stepped portions and four or more portions connected to each other via the stepped portions.

Figure 8F:
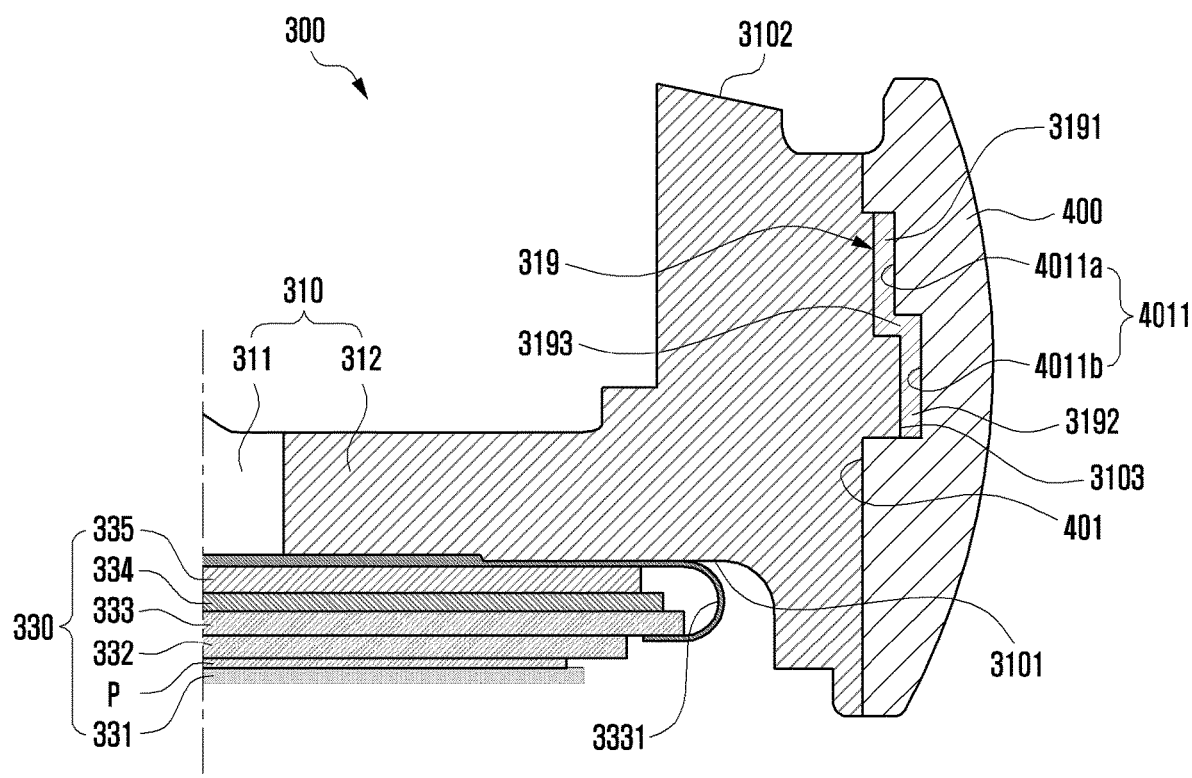

Referring to FIG. 8F, the electronic device 300 may include a conductive member 319 disposed between the frame member 400 and the first non-conductive part 312. The conductive member 319 may operate as an antenna that transmits or receives wireless signals in a predetermined frequency band by being electrically connected to a wireless communication circuit (e.g., the wireless communication module 192 in FIG. 1) disposed in the electronic device 300. According to an embodiment, the conductive member 319 may include a first portion 3191 and a second portion 3192 each having a predetermined length in a first direction (e.g., the z-axis direction). According to an embodiment, the first portion 3191 may be connected to the second portion 3192 via a stepped portion 3193 extending in a second direction (e.g., the −y-axis direction) substantially perpendicular to the first direction (e.g., the z-axis direction). According to an embodiment, the first portion 3191, the second portion 3192, and the stepped portion 3193 may be integrated with each other.

According to an embodiment, the conductive member 319 may be disposed in the recess 4011 formed in the inner surface 401 of the frame member 400. For example, the recess 4011 may include a first recess 4011a configured to accommodate the first portion 3191 and a second recess 4011b formed in the first recess 4011a and configured to accommodate the second portion 3192. According to an embodiment, the conductive member 319 may be temporarily fixed to the recess 4011 of the frame member 400 through a bonding process such as bonding or taping before the injection molding of the first non-conductive part 312.

According to an embodiment, the conductive member 319 may be disposed to be farther away from the bent portion 3331 of the display 330, which is a conductive structure disposed in the electronic device 300, when progressing from the first portion 3191 to the second portion 3162, thereby helping to suppress the degradation of radiation performance of the antenna. In some embodiments, the conductive member 316 may include two or more stepped portions and three or more portions connected to each other via the stepped portions.

According to an embodiment, an electronic device (e.g., the electronic device 300 in FIG. 5) may include a side member (e.g., the side member 310 in FIG. 5) including a conductive part (e.g., the conductive part 311 in FIG. 5) and a first non-conductive part (e.g., the first non-conductive part 312 in FIG. 5), a frame member (e.g., the frame member 400 in FIG. 5) disposed on at least a portion of the side member to be at least partially visible from an exterior of the electronic device, a second non-conductive part (e.g., the second non-conductive part 313 in FIG. 5) disposed between the frame member and the first non-conductive part, at least one conductive member (e.g., the conductive member 314 in FIG. 5) disposed between the second non-conductive part and the first non-conductive part, at least one conductive structure (e.g., the display 330 in FIG. 5) disposed near the at least one conductive member in an internal space (e.g., the internal space 3001 in FIG. 4A) of the electronic device, and a wireless communication circuit (e.g., the wireless communication module 192 in FIG. 1) disposed in the internal space and configured to transmit or receive a wireless signal in at least one predetermined frequency band via the at least one conductive member, wherein the at least one conductive member includes at least one stepped portion (e.g., the stepped portion 314c min FIG. 5) so that at least a portion of the at least one conductive member (e.g., the second portion 314b in FIG. 5) may be disposed in a direction away from the at least one conductive structure.

According to an embodiment, the at least one conductive member may include a first portion disposed to have a first length in a first direction, and a second portion disposed to extend from the first portion and connected to the first portion via the at least one stepped portion, and having a second length, wherein the second portion may be disposed to be closer to the frame member than the first portion in a second direction that is different from the first direction.

According to an embodiment, the first length and the second length may be substantially equal to each other.

According to an embodiment, the first length and the second length may be different from each other.

According to an embodiment, the at least one conductive member may be disposed to have a substantially constant separation distance relative to the frame member.

According to an embodiment, the frame member may include a recess on an inner surface thereof corresponding to the second portion.

According to an embodiment, the radiation performance of the at least one conductive member may be determined by the shortest distance between the second portion and the at least one conductive structure.

According to an embodiment, the at least one conductive member may be at least partially fixed to the first non-conductive part.

According to an embodiment, the at least one conductive member may be at least partially fixed to the second non-conductive part.

According to an embodiment, the second non-conductive part may be applied through an injection process for bonding the frame member and the first non-conductive part to each other.

According to an embodiment, the side member may include a first surface, a second surface facing away from the first surface, and a side surface surrounding a space between the first surface and the second surface, and the frame member may be disposed on at least a portion of the side surface.

According to an embodiment, the side surface may be covered by the frame member so as to be invisible from the exterior.

According to an embodiment, at least a portion of the side surface may be visible from the exterior.

According to an embodiment, the frame member may be a closed loop disposed along the side surface.

According to an embodiment, the electronic device may further include a first plate disposed over the first surface, a second plate disposed over the second surface, and a display disposed between the first plate and the first surface and disposed to be visible from the exterior through at least a portion of the first plate.

According to an embodiment, the at least one conductive structure may include a conductive bent portion disposed to extend from the display toward the frame member.

According to an embodiment, the at least one conductive member may include a first conductive member and a second conductive member segmented from each other via at least one segmented portion, and the first conductive member and/or the second conductive member may be made of substantially the same metal material as the conductive part.

According to an embodiment, the first non-conductive part and the second non-conductive part may be made of substantially the same polymer material.

According to an embodiment, the at least one predetermined frequency band may include a range of 600 MHz to 6000 MHz.

According to various embodiments, the frame member may be made of a ceramic material.

The embodiments of the disclosure disclosed in this specification and drawings are provided merely to propose specific examples in order to easily describe the technical features according to the embodiments of the disclosure and to help understanding of the embodiments of the disclosure, and are not intended to limit the scope of the embodiments of the disclosure. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure.

The invention claimed is:

1. An electronic device comprising:
a side member including a conductive part and a first non-conductive part;
a frame member disposed on at least a portion of the side member to be at least partially visible from an exterior of the electronic device;
a second non-conductive part disposed between the frame member and the first non-conductive part;
at least one conductive member disposed between the second non-conductive part and the first non-conductive part;
at least one conductive structure disposed near the at least one conductive member in an internal space of the electronic device; and
a wireless communication circuit disposed in the internal space and configured to transmit or receive a wireless signal in at least one predetermined frequency band via the at least one conductive member,
wherein the at least one conductive member includes at least one stepped portion so that at least a portion of the at least one conductive member is disposed in a direction away from the at least one conductive structure, the at least one conductive member including:
a first portion disposed along a first direction; and
a second portion disposed to extend from the first portion and connected to the first portion via the at least one stepped portion,
wherein the first portion and the second portion are separated by substantially the same distance from the frame member in a direction perpendicular to the first direction.

2. The electronic device of claim 1, wherein:
first portion is disposed to have a first length in a first direction,
wherein the second portion is disposed to have a second length in the first direction, and
wherein the second portion is disposed to be closer to the frame member than the first portion in a second direction toward the frame member that is different from the first direction.

3. The electronic device of claim 2, wherein the first length and the second length are equal to each other.

4. The electronic device of claim 2, wherein the first length and the second length are different from each other.

5. The electronic device of claim 1, wherein the frame member includes a recess on an inner surface thereof corresponding to the second portion.

6. The electronic device of claim 1, wherein radiation performance of the at least one conductive member is determined by a shortest distance between the second portion and the at least one conductive structure.

7. The electronic device of claim 1, wherein the at least one conductive member is at least partially fixed to the first non-conductive part.

8. The electronic device of claim 1, wherein the at least one conductive member is at least partially fixed to the second non-conductive part.

9. The electronic device of claim 8, wherein the second non-conductive part is applied through an injection process for bonding the frame member and the first non-conductive part to each other.

10. The electronic device of claim 1, wherein the side member includes a first surface, a second surface facing away from the first surface, and a side surface surrounding a space between the first surface and the second surface, and
wherein the frame member is disposed on at least a portion of the side surface.

11. The electronic device of claim 10, wherein the side surface is covered by the frame member so as to be invisible from the exterior.

12. The electronic device of claim 11, wherein at least a portion of the side surface is visible from the exterior.

13. The electronic device of claim 10, wherein the frame member is a closed loop disposed along the side surface.

14. The electronic device of claim 10, further comprising:
a first plate disposed over the first surface;
a second plate disposed over the second surface; and
wherein the at least one conductive structure comprises at least a part of a display disposed between the first plate and the first surface, the display being disposed to be visible from the exterior through at least a portion of the first plate.

15. The electronic device of claim 14, wherein the at least a part of the display includes a conductive bent portion disposed to extend from the toward the frame member.

16. The electronic device of claim 1, wherein the at least one conductive member includes a first conductive member and a second conductive member segmented from each other via at least one segmented portion, and
wherein the first conductive member and/or the second conductive member are made of a same metal material as the conductive part.

17. The electronic device of claim 1, wherein the first non-conductive part and the second non-conductive part are made of a same polymer material.

18. The electronic device of claim 1, wherein the at least one predetermined frequency band includes a range of 600 MHz to 6000 MHz.

19. The electronic device of claim 1, wherein the frame member is made of a ceramic material.

20. The electronic device of claim 1, wherein the first portion and the second portion are separated by substantially the same distance from the frame member via a recess on an inner surface of the frame member corresponding to the second portion.

* * * * *